United States Patent
Bercovitz et al.

(10) Patent No.: US 12,524,561 B2
(45) Date of Patent: Jan. 13, 2026

(54) SYSTEMS AND METHODS TO PERFORM END TO END ENCRYPTION

(71) Applicant: Verkada Inc., San Mateo, CA (US)

(72) Inventors: Benjamin J. Bercovitz, San Mateo, CA (US); Anurag Arora, Hayward, CA (US)

(73) Assignee: Verkada Inc., San Mateo, CA (US)

( * ) Notice: Subject to any disclaimer, the term of this patent is extended or adjusted under 35 U.S.C. 154(b) by 0 days.

(21) Appl. No.: 18/737,146

(22) Filed: Jun. 7, 2024

(65) Prior Publication Data
US 2025/0165636 A1     May 22, 2025

Related U.S. Application Data

(63) Continuation of application No. 18/518,343, filed on Nov. 22, 2023, now Pat. No. 12,019,778.

(51) Int. Cl.
| | | |
|---|---|---|
| *G06F 21/62* | (2013.01) | |
| *G06F 21/31* | (2013.01) | |
| *G06F 21/60* | (2013.01) | |

(52) U.S. Cl.
CPC .......... *G06F 21/6218* (2013.01); *G06F 21/31* (2013.01); *G06F 21/602* (2013.01)

(58) Field of Classification Search
CPC ..... G06F 21/6218; G06F 21/31; G06F 21/602
See application file for complete search history.

(56) References Cited

U.S. PATENT DOCUMENTS

| | | |
|---|---|---|
| 6,941,459 B1 | 9/2005 | Hind et al. |
| 6,961,849 B1 | 11/2005 | Davis et al. |
| 6,978,367 B1 | 12/2005 | Hind et al. |
| 7,203,317 B2 | 4/2007 | Kallahalla et al. |
| 7,231,517 B1 | 6/2007 | Mashayekhi |
| 7,359,517 B1 | 4/2008 | Rowe |
| 7,986,785 B2 | 7/2011 | Saito |
| 8,082,446 B1 | 12/2011 | Carroll |

(Continued)

OTHER PUBLICATIONS

Author Unknown, "About 1Password Unlock with SSO security". Sep. 5, 2023; retrieved from Internet at https://support.1password.com/sso-security/ on Oct. 26, 2023, 5 pages.

(Continued)

*Primary Examiner* — Aravind K Moorthy
(74) *Attorney, Agent, or Firm* — COOLEY LLP

(57) ABSTRACT

A first document including a decrypting version of a first key and a second document including a representation of a login token are received from the first compute device. An encrypted second key that has been encrypted by an encrypting version of the first key is received after receiving the login token from a second compute device. The second compute device stores the encrypting version of the first key before the receiving of the first document. The encrypted second key is decrypted using the decrypting version of the first key to obtain a plaintext second key. Encrypted sensor data that includes plaintext sensor data that has been (1) captured prior to the receiving of the first document, and (2) encrypted by the plaintext second key is received from the second compute device. The encrypted sensor data is decrypted using the plaintext second key to obtain the plaintext sensor data.

20 Claims, 6 Drawing Sheets

(56) References Cited

U.S. PATENT DOCUMENTS

| | | | |
|---|---|---|---|
| 8,190,921 B1 | 5/2012 | Harwood et al. | |
| 8,489,889 B1 | 7/2013 | Moscaritolo et al. | |
| 8,532,300 B1 | 9/2013 | Searles | |
| 8,914,632 B1* | 12/2014 | Shankar | G06F 21/6218 713/167 |
| 9,172,532 B1 | 10/2015 | Fuller et al. | |
| 9,191,200 B1* | 11/2015 | Adams | H04W 12/06 |
| 9,195,851 B1* | 11/2015 | Chandra | H04L 9/0825 |
| 9,205,336 B1 | 12/2015 | Yano | |
| 9,240,883 B2 | 1/2016 | Chew | |
| 9,270,449 B1 | 2/2016 | Tribble et al. | |
| 9,336,092 B1 | 5/2016 | Li | |
| 9,397,835 B1 | 7/2016 | Campagna et al. | |
| 9,602,283 B1* | 3/2017 | Chandra | H04L 9/32 |
| 9,608,970 B1* | 3/2017 | Gehret | G07C 9/22 |
| 9,673,975 B1 | 6/2017 | Machani | |
| 9,722,974 B1 | 8/2017 | Fuller et al. | |
| 9,749,299 B1 | 8/2017 | Sokolov et al. | |
| 9,762,386 B1 | 9/2017 | Nassaje et al. | |
| 9,779,220 B1 | 10/2017 | Kronrod et al. | |
| 9,832,171 B1 | 11/2017 | Roth et al. | |
| 9,866,392 B1 | 1/2018 | Campagna et al. | |
| 10,263,778 B1 | 4/2019 | Grubin et al. | |
| 10,270,587 B1* | 4/2019 | Wu | H04L 9/3234 |
| 10,298,551 B1* | 5/2019 | Perlman | G06F 21/602 |
| 10,432,589 B1* | 10/2019 | M'Raihi | H04L 63/065 |
| 10,516,527 B1* | 12/2019 | Machani | H04L 9/0625 |
| 10,735,436 B1* | 8/2020 | Chernilovsky | G06K 7/1417 |
| 10,903,990 B1* | 1/2021 | Ladd | H04L 9/0841 |
| 10,931,450 B1 | 2/2021 | Chellappa et al. | |
| 10,979,230 B1 | 4/2021 | Tang | |
| 11,062,046 B1 | 7/2021 | Thapar | |
| 11,101,999 B2* | 8/2021 | Leavy | H04L 9/0643 |
| 11,196,548 B1* | 12/2021 | Buendgen | H04L 9/0869 |
| 11,212,264 B1* | 12/2021 | Griffin | H04L 9/14 |
| 11,437,102 B1 | 9/2022 | Cohen et al. | |
| 11,444,754 B1 | 9/2022 | Shaked et al. | |
| 11,502,827 B1* | 11/2022 | Miller | H04L 9/3242 |
| 11,539,512 B2 | 12/2022 | Wall et al. | |
| 11,601,402 B1 | 3/2023 | Delaney et al. | |
| 11,640,484 B1 | 5/2023 | Kumar | |
| 11,658,812 B1* | 5/2023 | Chamorro | H04L 9/0897 380/279 |
| 11,675,919 B2* | 6/2023 | Ramesh | H04L 9/0822 713/193 |
| 11,711,755 B1* | 7/2023 | Newman | H04W 8/18 370/329 |
| 11,799,633 B1* | 10/2023 | Cartagena | H04L 9/0822 |
| 11,886,545 B2 | 1/2024 | Grab et al. | |
| 11,895,227 B1* | 2/2024 | Chamorro | H04L 9/0827 |
| 12,019,778 B1* | 6/2024 | Bercovitz | G06F 21/602 |
| 2002/0152392 A1 | 10/2002 | Hardy et al. | |
| 2005/0018842 A1 | 1/2005 | Fu et al. | |
| 2005/0091173 A1 | 4/2005 | Alve | |
| 2005/0138382 A1* | 6/2005 | Hougaard | G06Q 10/10 713/176 |
| 2006/0004662 A1 | 1/2006 | Nadalin et al. | |
| 2006/0020786 A1 | 1/2006 | Helms et al. | |
| 2006/0093150 A1 | 5/2006 | Reddy et al. | |
| 2006/0115085 A1 | 6/2006 | Iwamura | |
| 2007/0050696 A1* | 3/2007 | Piersol | G06F 21/6209 715/209 |
| 2007/0107063 A1 | 5/2007 | Eckleder | |
| 2007/0265973 A1 | 11/2007 | Kahn | |
| 2007/0280483 A1* | 12/2007 | Fu | H04L 9/0822 380/286 |
| 2008/0019526 A1* | 1/2008 | Fu | H04L 9/0822 380/277 |
| 2008/0080708 A1* | 4/2008 | McAlister | H04L 9/0844 380/44 |
| 2008/0098212 A1 | 4/2008 | Helms et al. | |
| 2008/0189548 A1* | 8/2008 | Steeves | G06F 21/602 726/25 |
| 2009/0060178 A1 | 3/2009 | Montgomery et al. | |
| 2009/0084713 A1* | 4/2009 | Miller | B07C 3/00 209/584 |
| 2009/0154703 A1 | 6/2009 | Price et al. | |
| 2009/0157551 A1 | 6/2009 | Bellwood et al. | |
| 2009/0208015 A1 | 8/2009 | Kamat et al. | |
| 2009/0245517 A1 | 10/2009 | Tinnakornsrisuphap et al. | |
| 2009/0271620 A1 | 10/2009 | Sudhakar | |
| 2010/0054477 A1 | 3/2010 | Chew | |
| 2010/0082989 A1* | 4/2010 | Bussard | G06F 21/6218 713/168 |
| 2010/0166189 A1 | 7/2010 | Morohoshi et al. | |
| 2010/0169669 A1* | 7/2010 | Smith | G06F 21/6218 713/193 |
| 2010/0191772 A1* | 7/2010 | Brown | G06Q 10/10 707/E17.113 |
| 2011/0055560 A1 | 3/2011 | Meissner et al. | |
| 2011/0082798 A1 | 4/2011 | Michaud et al. | |
| 2011/0261959 A1 | 10/2011 | Joseph et al. | |
| 2011/0283113 A1* | 11/2011 | Moffat | G06F 21/602 713/189 |
| 2011/0293096 A1 | 12/2011 | Reilly et al. | |
| 2012/0117232 A1* | 5/2012 | Brown | G06Q 10/10 709/224 |
| 2012/0173885 A1* | 7/2012 | Acar | G06F 21/602 713/193 |
| 2012/0213370 A1 | 8/2012 | Moskovics et al. | |
| 2012/0221659 A1* | 8/2012 | Brown | H04L 67/10 709/206 |
| 2012/0275596 A1 | 11/2012 | Ureche et al. | |
| 2012/0317414 A1 | 12/2012 | Glover | |
| 2013/0070923 A1 | 3/2013 | Kang et al. | |
| 2013/0110728 A1* | 5/2013 | Kobres | H04W 12/10 705/78 |
| 2013/0111208 A1* | 5/2013 | Sabin | G06F 21/36 713/176 |
| 2013/0173915 A1* | 7/2013 | Haulund | H04L 63/18 713/155 |
| 2013/0233916 A1* | 9/2013 | Tran | G06K 19/06037 235/375 |
| 2013/0254536 A1 | 9/2013 | Glover | |
| 2014/0032900 A1 | 1/2014 | Donahue | |
| 2014/0037093 A1 | 2/2014 | Park et al. | |
| 2014/0093079 A1* | 4/2014 | Scott | H04L 9/0819 380/270 |
| 2014/0108810 A1* | 4/2014 | Chenna | H04L 9/3263 713/179 |
| 2014/0122884 A1* | 5/2014 | Pieczul | H04W 12/06 713/171 |
| 2014/0122894 A1* | 5/2014 | Sakumoto | G06F 21/602 713/185 |
| 2014/0223175 A1* | 8/2014 | Bhatnagar | H04L 63/18 713/159 |
| 2014/0237261 A1 | 8/2014 | Diep et al. | |
| 2014/0245388 A1* | 8/2014 | Nako | H04L 63/0853 726/3 |
| 2014/0258707 A1* | 9/2014 | Denny | H04L 9/0863 713/150 |
| 2014/0281574 A1 | 9/2014 | Webb | |
| 2014/0337634 A1* | 11/2014 | Starner | H04W 12/33 713/186 |
| 2015/0100780 A1 | 4/2015 | Rubin et al. | |
| 2015/0278531 A1* | 10/2015 | Smith | H04L 63/0428 713/165 |
| 2015/0319166 A1 | 11/2015 | Arnold et al. | |
| 2016/0006716 A1* | 1/2016 | Rothberg | G06Q 20/3829 726/7 |
| 2016/0065540 A1* | 3/2016 | Androulaki | G06F 21/602 713/171 |
| 2016/0134599 A1* | 5/2016 | Ross | H04L 63/0815 713/168 |
| 2016/0154963 A1* | 6/2016 | Kumar | G06F 21/602 713/189 |
| 2016/0188889 A1* | 6/2016 | Narendra Trivedi | G06F 21/6218 713/189 |
| 2016/0300068 A1* | 10/2016 | Gillespie | G06F 21/602 |
| 2016/0307194 A1* | 10/2016 | Bhatnagar | H04L 63/0838 |

(56) References Cited

U.S. PATENT DOCUMENTS

| | | | |
|---|---|---|---|
| 2016/0308678 A1* | 10/2016 | Bhatnagar | H04L 9/3228 |
| 2016/0323108 A1* | 11/2016 | Bhogal | H04W 12/08 |
| 2016/0352518 A1* | 12/2016 | Ford | G06F 21/6218 |
| 2016/0365976 A1 | 12/2016 | Yamaguchi | |
| 2017/0019382 A1* | 1/2017 | Jain | H04L 63/06 |
| 2017/0094514 A1* | 3/2017 | Kelts | H04W 12/08 |
| 2017/0099268 A1* | 4/2017 | Camenisch | H04L 63/061 |
| 2017/0103025 A1 | 4/2017 | Meyer et al. | |
| 2017/0104593 A1* | 4/2017 | Vo | G09C 5/00 |
| 2017/0126408 A1 | 5/2017 | Van Someren | |
| 2017/0206532 A1* | 7/2017 | Choi | G06Q 30/02 |
| 2017/0318263 A1 | 11/2017 | Cocchi et al. | |
| 2017/0331628 A1 | 11/2017 | Adams et al. | |
| 2017/0357822 A1 | 12/2017 | Wei et al. | |
| 2018/0026949 A1* | 1/2018 | Kimn | H04W 12/069 713/156 |
| 2018/0041341 A1 | 2/2018 | Gulati | |
| 2018/0119975 A1* | 5/2018 | Park | G06F 21/602 |
| 2018/0144656 A1* | 5/2018 | Mitros | G09B 7/04 |
| 2018/0145831 A1 | 5/2018 | Garagnon et al. | |
| 2018/0157840 A1 | 6/2018 | Crowley | |
| 2018/0262337 A1 | 9/2018 | Zubov et al. | |
| 2018/0323970 A1 | 11/2018 | Maron et al. | |
| 2019/0103965 A1 | 4/2019 | Roake et al. | |
| 2019/0132133 A1 | 5/2019 | Druker | |
| 2019/0190704 A1* | 6/2019 | Srivastava | H04L 63/0428 |
| 2019/0207913 A1* | 7/2019 | Hwang | H04L 9/0819 |
| 2019/0228140 A1* | 7/2019 | Arroyo | G06V 40/1365 |
| 2019/0236022 A1* | 8/2019 | Gopal | G06F 3/0673 |
| 2019/0238331 A1 | 8/2019 | Chandra et al. | |
| 2019/0244215 A1 | 8/2019 | Watanabe et al. | |
| 2019/0274612 A1* | 9/2019 | Chavez, Jr. | G09B 5/14 |
| 2019/0274613 A1* | 9/2019 | Chavez, Jr. | A61B 5/168 |
| 2019/0334884 A1* | 10/2019 | Ross | G06F 21/41 |
| 2019/0356649 A1 | 11/2019 | Alwen et al. | |
| 2019/0370478 A1* | 12/2019 | Boccon-Gibod | G06F 21/6218 |
| 2020/0012763 A1 | 1/2020 | Arngren et al. | |
| 2020/0076807 A1* | 3/2020 | Driever | H04L 9/085 |
| 2020/0125742 A1* | 4/2020 | Kounavis | H04L 9/0822 |
| 2020/0134234 A1* | 4/2020 | LeMay | G06F 21/602 |
| 2020/0280544 A1 | 9/2020 | Sivaraman et al. | |
| 2020/0342117 A1* | 10/2020 | Richards | G06F 16/122 |
| 2020/0344062 A1 | 10/2020 | Haldar et al. | |
| 2020/0374274 A1 | 11/2020 | Momchilov et al. | |
| 2020/0389328 A1* | 12/2020 | Wu | H04L 9/0894 |
| 2020/0410113 A1* | 12/2020 | Gryb | H04L 9/302 |
| 2021/0014217 A1* | 1/2021 | Wei | H04L 63/12 |
| 2021/0034760 A1 | 2/2021 | Banga | |
| 2021/0042448 A1 | 2/2021 | Jeon et al. | |
| 2021/0056214 A1* | 2/2021 | Bursell | H04L 9/0872 |
| 2021/0058242 A1 | 2/2021 | Donsomsakunkij et al. | |
| 2021/0067328 A1* | 3/2021 | Verheyen | H04L 63/0442 |
| 2021/0085988 A1 | 3/2021 | Nin et al. | |
| 2021/0124818 A1* | 4/2021 | Muthukumaran | H04L 9/0894 |
| 2021/0133729 A1 | 5/2021 | Murao et al. | |
| 2021/0143983 A1* | 5/2021 | Lidzborski | H04L 9/083 |
| 2021/0144002 A1 | 5/2021 | Aronesty et al. | |
| 2021/0157904 A1* | 5/2021 | Bursell | G06F 12/1466 |
| 2021/0176050 A1* | 6/2021 | Lidzborski | H04L 9/0877 |
| 2021/0176053 A1 | 6/2021 | Santos et al. | |
| 2021/0217006 A1* | 7/2021 | Ragavan | G06Q 20/3829 |
| 2021/0218555 A1 | 7/2021 | Mastenbrook et al. | |
| 2021/0243018 A1* | 8/2021 | Jacobs | H04L 9/0894 |
| 2021/0264799 A1 | 8/2021 | Belt et al. | |
| 2021/0271763 A1 | 9/2021 | Perlman et al. | |
| 2021/0306149 A1* | 9/2021 | Griera | H04L 9/0894 |
| 2021/0306150 A1 | 9/2021 | Connard et al. | |
| 2021/0328974 A1* | 10/2021 | Grooters | H04L 9/0643 |
| 2021/0344485 A1* | 11/2021 | Levin | H04L 9/0825 |
| 2021/0349986 A1 | 11/2021 | Jiang et al. | |
| 2021/0390189 A1* | 12/2021 | Nagao | H04L 9/0825 |
| 2021/0397425 A1* | 12/2021 | Zwarich | G06F 9/4552 |
| 2021/0399880 A1* | 12/2021 | Gupta | H04L 9/088 |
| 2022/0006613 A1 | 1/2022 | Hetzler | |
| 2022/0014918 A1 | 1/2022 | Mastenbrook et al. | |
| 2022/0029820 A1* | 1/2022 | Mozano | H04L 9/0891 |
| 2022/0044506 A1* | 2/2022 | Dewey | G07C 9/215 |
| 2022/0069981 A1* | 3/2022 | Jog | H04L 9/0861 |
| 2022/0100822 A1 | 3/2022 | Simioni et al. | |
| 2022/0116367 A1 | 4/2022 | Gordon | |
| 2022/0129443 A1 | 4/2022 | Nadeau et al. | |
| 2022/0150224 A1 | 5/2022 | Courtney | |
| 2022/0173894 A1 | 6/2022 | Cain, Jr. et al. | |
| 2022/0173904 A1* | 6/2022 | Kesari | H04L 9/0894 |
| 2022/0191039 A1* | 6/2022 | Kisley | H04L 9/088 |
| 2022/0198027 A1* | 6/2022 | Chhabra | G06F 21/74 |
| 2022/0200800 A1 | 6/2022 | Xu et al. | |
| 2022/0207114 A1 | 6/2022 | Pfeifer et al. | |
| 2022/0237282 A1 | 7/2022 | Tzur-David et al. | |
| 2022/0237329 A1 | 7/2022 | Dahiya et al. | |
| 2022/0261157 A1 | 8/2022 | Rao et al. | |
| 2022/0263657 A1 | 8/2022 | Chang et al. | |
| 2022/0292622 A1* | 9/2022 | Soscia | H04L 9/3242 |
| 2022/0311620 A1 | 9/2022 | Saha et al. | |
| 2022/0321331 A1* | 10/2022 | Kisley | H04L 9/0852 |
| 2022/0321339 A1* | 10/2022 | Yedluri | H04L 9/0894 |
| 2022/0327249 A1 | 10/2022 | Kulkarni et al. | |
| 2022/0329433 A1* | 10/2022 | Doshi | H04L 9/3226 |
| 2022/0366429 A1* | 11/2022 | Pati | G06Q 30/012 |
| 2022/0368681 A1 | 11/2022 | Nomani et al. | |
| 2022/0385464 A1 | 12/2022 | Anand et al. | |
| 2022/0385643 A1 | 12/2022 | Movva et al. | |
| 2022/0385646 A1 | 12/2022 | Basu et al. | |
| 2022/0385649 A1 | 12/2022 | Basu et al. | |
| 2022/0399995 A1* | 12/2022 | Moon | H04L 9/0861 |
| 2022/0400006 A1* | 12/2022 | Hunsberger | H04W 12/041 |
| 2022/0400102 A1* | 12/2022 | Moon | H04L 9/40 |
| 2022/0414261 A1 | 12/2022 | Thapar | |
| 2023/0012013 A1 | 1/2023 | Livshin et al. | |
| 2023/0059173 A1* | 2/2023 | Moon | H04L 63/0876 |
| 2023/0063632 A1* | 3/2023 | Robinson-Morgan | G06F 11/1469 |
| 2023/0065676 A1* | 3/2023 | Obstfeld | H04L 67/12 |
| 2023/0068317 A1* | 3/2023 | Ranha | G06K 7/10881 |
| 2023/0078187 A1 | 3/2023 | Kennedy et al. | |
| 2023/0126961 A1* | 4/2023 | Leong | G06F 21/72 713/171 |
| 2023/0162234 A1* | 5/2023 | Ramirez | G06Q 20/3829 705/14.62 |
| 2023/0163981 A1* | 5/2023 | Subramanian | G06K 7/1417 713/189 |
| 2023/0205908 A1 | 6/2023 | Kostushko et al. | |
| 2023/0208821 A1* | 6/2023 | Wu | H04L 63/0435 726/26 |
| 2023/0247010 A1 | 8/2023 | O'Connell et al. | |
| 2023/0254134 A1 | 8/2023 | Burnett et al. | |
| 2023/0259899 A1 | 8/2023 | Albert et al. | |
| 2023/0269690 A1 | 8/2023 | Ramezan et al. | |
| 2023/0291548 A1* | 9/2023 | Mastenbrook | H04L 9/3265 |
| 2023/0291565 A1 | 9/2023 | Ureche et al. | |
| 2023/0385428 A1* | 11/2023 | Stahlberg | G06F 21/602 |
| 2023/0412374 A1 | 12/2023 | Hohner et al. | |
| 2023/0421373 A1* | 12/2023 | Ryan | H04L 9/0894 |
| 2024/0022405 A1* | 1/2024 | Sood | H04L 9/3073 |
| 2024/0028758 A1* | 1/2024 | Wall | G06F 21/31 |
| 2024/0046268 A1* | 2/2024 | Strealy | G06Q 10/02 |
| 2024/0073013 A1* | 2/2024 | Lal | G06F 12/1441 |
| 2024/0080315 A1* | 3/2024 | Ravuna | H04L 63/0838 |
| 2024/0146717 A1* | 5/2024 | Vijayasankar | H04L 63/0428 |
| 2024/0193603 A1* | 6/2024 | Wolfs | G06Q 20/385 |
| 2024/0205012 A1* | 6/2024 | Jordan | H04L 9/0866 |
| 2024/0242255 A1* | 7/2024 | Blumenfeld | G06Q 30/0601 |
| 2024/0256105 A1* | 8/2024 | Yu | G06F 21/316 |
| 2024/0311750 A1* | 9/2024 | Goeters | G06Q 10/0838 |
| 2025/0005172 A1* | 1/2025 | Ryoo | G06F 21/602 |

OTHER PUBLICATIONS

Author Unknown, "How Google Workspace uses encryption to protect your data". Google Workspace, Aug. 17, 2021; https://web.archive.org/web/20210817050845/https://services.google.com/fh/files/misc/google-workspace-encryption-wp.pdf, accessed Feb. 15, 2023, 19 pages.

(56) References Cited

OTHER PUBLICATIONS

Author Unknown, "How Google Workspace uses encryption to protect your data". Google Workspace, Google Cloud Whitepaper, Aug. 2020; https://services.google.com/fh/files/helpcenter/google_encryptionwp2016.pdf, accessed Feb. 15, 2023, 14 pages.

Author Unknown, WhatsApp Encryption Overview, Technical white paper, Version 6 Updated Jan. 24, 2023, https://www.scribd.com/document/628464023/328619852-1611854775910507-3217786758896242477-n-1, 29 pages.

Blum et al., "Zoom Cryptography Whitepaper". Zoom Video Communications, Mar. 27, 2023; 79 pages.

Blum et al., "Zoom Cryptography Whitepaper". Zoom Video Communications, Nov. 21, 2023; https://raw.githubusercontent.com/zoom/zoom-e2e-whitepaper/master/zoom_e2e.pdf, accessed Feb. 15, 2024, 85 pages.

Hu, Vincent, "Overview and Considerations of Access Control Based on Attribute Encryption". National Institute of Standards and Technology, NIST IR 8450, Sep. 2023 Includes updates as of Dec. 20, 2023; https://nvlpubs.nist.gov/nistpubs/ir/2023/NIST.IR.8450-upd1.pdf, 41 pages, Accessed Feb. 15, 2023.

Kaur, Y. "Introducing Unlock with Okta for 1Password Business" Mar. 8, 2023, retrieved from internet at https://blog.1password.com/unlock-with-okta/, 4 pages.

Notice of Allowance for U.S. Appl. No. 18/518,343 dated Feb. 14, 2024, 21 pages.

Perlow, J., "Linux Foundation, BastionZero and Docker Announce the Launch of the OpenPubkey Project," Oct. 4, 2023, retrieved from internet at https://www.linuxfoundation.org/press/announcing-openpubkey-project, 4 pages.

Skiff, "End-to-end encrypted, Privacy-FirstWorkspace". Dec. 2022; https://skiff-org.github.io/whitepaper/Skiff_Whitepaper_2022.pdf, accessed Feb. 15, 2023, 9 pages.

International Search Report and Written Opinion for PCT Application No. PCT/US2024/054367, by Verkada Inc., mailed Jan. 27, 2025; 13 pages.

\* cited by examiner

```
                200

┌─────────────────────────────────────────────────────────────────────────┐
    │ Receive a first document including a first version of a first key from a first compute device 202 │
    └─────────────────────────────────────────────────────────────────────────┘
                                        ↓
    ┌─────────────────────────────────────────────────────────────────────────┐
    │ Receive a second document including a representation of a login token from the first compute device 204 │
    └─────────────────────────────────────────────────────────────────────────┘
                                        ↓
    ┌─────────────────────────────────────────────────────────────────────────┐
    │ Receive, from a second compute device that is different from the first compute device and that is storing a second version of the first key, and after receiving the representation of the login token, an encrypted second key that has been encrypted by the second version of the first key, the second version of the first key stored on the second compute device before the receiving of the first document 206 │
    └─────────────────────────────────────────────────────────────────────────┘
                                        ↓
    ┌─────────────────────────────────────────────────────────────────────────┐
    │ Decrypt the encrypted second key using the first version of the first key to obtain a plaintext second key 208 │
    └─────────────────────────────────────────────────────────────────────────┘
                                        ↓
    ┌─────────────────────────────────────────────────────────────────────────┐
    │ Receive, from the second compute device, encrypted sensor data that has been (1) captured prior to the receiving of the first document, and (2) encrypted by the plaintext second key 210 │
    └─────────────────────────────────────────────────────────────────────────┘
                                        ↓
    ┌─────────────────────────────────────────────────────────────────────────┐
    │ Decrypt the encrypted sensor data using the plaintext second key, to obtain the plaintext sensor data 212 │
    └─────────────────────────────────────────────────────────────────────────┘
```

Receive a first document including a first version of a first key from a first compute device 302

Receive a second document including a representation of a login token from the first compute device 304

Receive, from a second compute device different than the first compute device, an encrypted second key that has been encrypted by a second version of the first key 306

Decrypt the encrypted second key using the first version of the first key to obtain a first version of a second key 308

Receive, from a third compute device different than the first compute device and the second compute device, an encrypted third key that has been encrypted by an second version of the second key 310

Decrypt the encrypted third key using the first version of the second key to obtain a plaintext third key 312

Receive, via the third compute device, encrypted sensor data that has been encrypted by the plaintext third key 314

Decrypt the encrypted sensor data using the plaintext third key, to obtain plaintext sensor data 316

┌─────────────────────────────────────────────────────────────────────────────────────────┐
│ Receiving, from a first compute device, a first document including a first version of a first key 402 │
└─────────────────────────────────────────────────────────────────────────────────────────┘
                                              ↓
┌─────────────────────────────────────────────────────────────────────────────────────────┐
│ Receiving, from the first compute device, a second document including a representation of a login token 404 │
└─────────────────────────────────────────────────────────────────────────────────────────┘
                                              ↓
┌─────────────────────────────────────────────────────────────────────────────────────────┐
│ Receiving, from a second compute device, an encrypted second key that has been encrypted by a first version of the first key 406 │
└─────────────────────────────────────────────────────────────────────────────────────────┘
                                              ↓
┌─────────────────────────────────────────────────────────────────────────────────────────┐
│ Decrypting the encrypted second key using the first version of the first key to obtain a second key 408 │
└─────────────────────────────────────────────────────────────────────────────────────────┘
                                              ↓
┌─────────────────────────────────────────────────────────────────────────────────────────┐
│ Receiving, from the second compute device, an encrypted third key that has been encrypted by a second version of the second key 410 │
└─────────────────────────────────────────────────────────────────────────────────────────┘
                                              ↓
┌─────────────────────────────────────────────────────────────────────────────────────────┐
│ Decrypting the encrypted third key using a first version of the second key to obtain a third key 412 │
└─────────────────────────────────────────────────────────────────────────────────────────┘
                                              ↓
┌─────────────────────────────────────────────────────────────────────────────────────────┐
│ Receiving, from a third compute device, an encrypted fourth key that has been encrypted by the second version of the third key 414 │
└─────────────────────────────────────────────────────────────────────────────────────────┘
                                              ↓
┌─────────────────────────────────────────────────────────────────────────────────────────┐
│ Decrypting the encrypted fourth key using a first version of the third key to obtain a plaintext fourth key 416 │
└─────────────────────────────────────────────────────────────────────────────────────────┘
                                              ↓
┌─────────────────────────────────────────────────────────────────────────────────────────┐
│ Receiving, from the third compute device, encrypted sensor data that has been encrypted by the plaintext fourth key 418 │
└─────────────────────────────────────────────────────────────────────────────────────────┘
                                              ↓
┌─────────────────────────────────────────────────────────────────────────────────────────┐
│ Decrypting the encrypted sensor data using the plaintext fourth key to obtain plaintext sensor data 420 │
└─────────────────────────────────────────────────────────────────────────────────────────┘
```

FIG. 4

Receiving a first document including a first version of a first key from a first compute device 502

Receiving a second document including a representation of a login token from the first compute device 504

Sending a second version of a second key signed using the first version of the first key to a second compute device to cause the second compute device to verify the second version of the second key using a second version of the first key, the second version of the first key stored on the second compute device before the receiving of the first document 506

Receiving an encrypted third key, that has been encrypted by the second version of the second key, from the second compute device 508

Decrypting the encrypted third key using a first version of the second key to obtain a plaintext third key 510

Receiving, from the second compute device, encrypted sensor data that has been encrypted by the plaintext third key 512

Decrypting the encrypted sensor data using the plaintext third key, to obtain plaintext sensor data 514

FIG. 5

SYSTEMS AND METHODS TO PERFORM END TO END ENCRYPTION

CROSS-REFERENCE TO RELATED APPLICATIONS

This application is a Continuation of U.S. patent application Ser. No. 18/518,343, filed Nov. 22, 2023 and titled "Systems and Methods to Perform End to End Encryption," now U.S. Pat. No. 12,019,778, the disclosure of which is hereby incorporated by reference in its entirety.

FIELD

One or more embodiments are related to systems and methods to perform end to end encryption.

BACKGROUND

For a service provider that facilities providing a customer access to data (e.g., video data) captured by a remote compute device (e.g., including a camera), it can be desirable to let the customer's compute device decrypt and have access to the data while limiting the ability of the service provider's compute device to decrypt and have access to the data.

SUMMARY

In an embodiment, a first document including a first version of a first key is received at a processor and from a first compute device. A second document including a representation of a login token is received at the processor and from the first compute device. An encrypted second key that has been encrypted by a second version of the first key is received at the processor after receiving the representation of the login token from a second compute device that is different from the first compute device. The second compute device stores the second version of the first key. The second version of the first key is stored on the second compute device before the receiving of the first document. The encrypted second key is decrypted by the processor using the first version of the first key to obtain a plaintext (e.g., unencrypted) second key. Encrypted sensor data that has been (1) captured prior to the receiving of the first document, and (2) encrypted by the plaintext second key is received at the processor and from the second compute device. The encrypted sensor data is decrypted by the processor, using the plaintext second key, to obtain plaintext sensor data.

In an embodiment, a first document including a first version of a first key is received at a processor and from a first compute device. A second document including a representation of a login token is received at the processor and from the first compute device. An encrypted second key that has been encrypted by a second version of the first key is received from a second compute device different than the first compute device. The encrypted second key is decrypted by the processor, using the first version of the first key, to obtain a first version of a second key. An encrypted third key that has been encrypted by a second version of the second key is received at the processor and from a third compute device different than the first compute device and the second compute device. The encrypted third key is decrypted by the processor, using the first version of the second key, to obtain a plaintext third key. Encrypted sensor data that has been encrypted by the plaintext third key is received via the third compute device. The encrypted sensor data is decrypted by the processor using the plaintext third key, to obtain plaintext sensor data.

In an embodiment, a first document including a first version of a first key is received at a processor and from a first compute device. A second document including a representation of a login token is received at the processor and from the first compute device. An encrypted second key that has been encrypted by a first version of the first key is received at the processor and from a second compute device. The encrypted second key is decrypted by the processor, using the first version of the first key, to obtain a second key. An encrypted third key that has been encrypted by a second version of the second key is received at the processor and from the second compute device. The encrypted third key is decrypted by the processor, using a first version of the second key, to obtain a third key. An encrypted fourth key that has been encrypted by the second version of the third key is received at the processor and from a third compute device. The encrypted fourth key is decrypted by the processor, using a first version of the third key, to obtain a plaintext fourth key. Encrypted sensor data that has been encrypted by the plaintext fourth key is received at the processor and from the third compute device. The encrypted sensor data is decrypted by the processor, using the plaintext fourth key, to obtain plaintext sensor data.

In an embodiment, a first document including a first version of a first key is received at the processor and from a first compute device. A second document including a representation of a login token is received at the processor and from the first compute device. A second version of a second key signed using the first version of the first key is sent to a second compute device to cause the second compute device to verify the second version of the second key using a second version of the first key. The second version of the first key is stored on the second compute device before the receiving of the first document. An encrypted third key is received at the processor and from the second compute device. The encrypted third key has been encrypted by the second version of the second key. The encrypted third key is decrypted by the processor, using a first version of the second key, to obtain a plaintext third key. Encrypted sensor data that has been encrypted by the plaintext third key is received at the processor and from the second compute device. The encrypted sensor data is decrypted by the processor, using the plaintext third key, to obtain plaintext sensor data.

In an embodiment, a first document including a first version of a first key is received at a processor and from a first compute device. A second document including a representation of a login token is received at the processor and from the first compute device. An encrypted second key that has been encrypted by a second version of the first key is received at the processor and from a second compute device. The encrypted second key is decrypted by the processor, using the first version of the first key, to obtain a second key. A second version of a third key signed using the first version of the second key is sent to a third compute device to cause the third compute device to verify the second version of the third key using a second version of the second key. The second version of the second key is stored on the third compute device before the receiving of the first document. An encrypted fourth key that has been encrypted by the second version of the third key is received at the processor and from the third compute device. The encrypted fourth key is decrypted by the processor, using a first version of the third key, to obtain a plaintext fourth key. Encrypted sensor data that has been encrypted by the plaintext fourth key is received at the processor and from the third compute device. The encrypted sensor data is decrypted by the processor, using the plaintext fourth key, to obtain plaintext sensor data.

BRIEF DESCRIPTION OF THE DRAWINGS

FIG. 2 shows a flowchart of a method to perform key rotation, encryption, and decryption across a user compute device, a sensor, and an identity provider compute device, according to an embodiment.

FIG. 3 shows a flowchart of a method to perform key rotation, encryption, and decryption across a user compute device, a sensor, an identity provider compute device, and a key management compute device, according to an embodiment.

FIG. 4 shows a flowchart of a method to perform key rotation, encryption, and decryption across a user compute device, a sensor, an identity provider compute device, and a key management compute device, according to an embodiment.

FIG. 5 shows a flowchart of a method to perform key rotation, encryption, and decryption across a user compute device, a sensor, and an identity provider compute device, according to an embodiment

DETAILED DESCRIPTION

Figure 1:
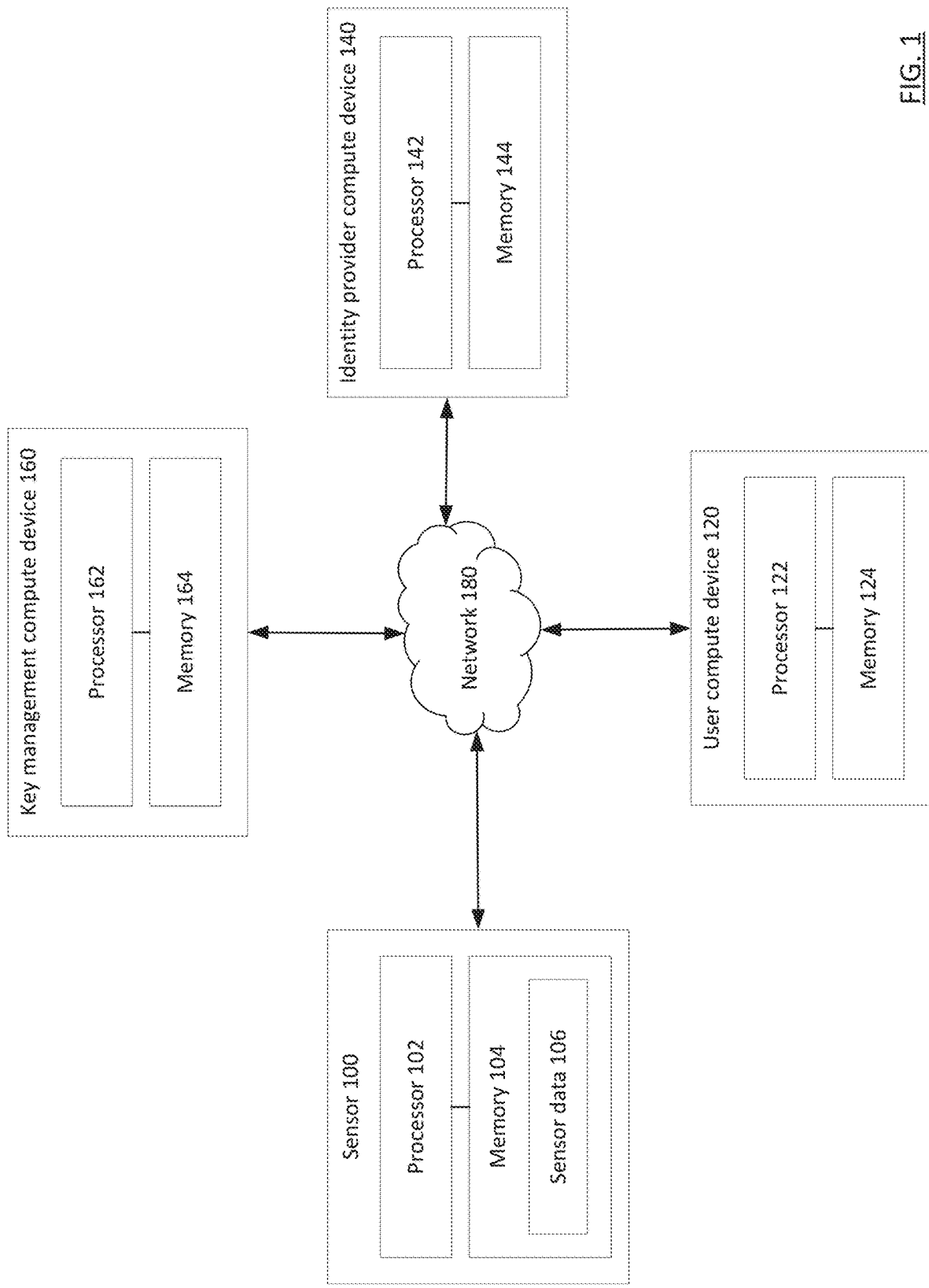
FIG. 1 shows a system block diagram to perform end to end encryption, according to an embodiment.

Organizations can own and/or manage fleets of sensors, and other organizations (and/or users) may wish to view sensor data captured by sensors from those fleets of sensors. For example, to gain access to such sensor data, a user at a second organization may create a user account that has one or more associated permissions (e.g., granted by a first organization) to access the sensor data. After creating the user account, the user can log into their user account via a browser (e.g., displayed via a graphical user interface (GUI) of their compute device) and access the sensor data that they have permission to access. In such a scenario, it can be desirable to minimize/limit the number of entities and/or compute devices that have access to a plaintext/unencrypted version of the sensor data. For example, it can be desirable to avoid letting a backend compute device associated with (e.g., owned by, operated by) the first organization have access to the plaintext/unencrypted version of the sensor data (e.g., for security reasons, for privacy reasons, for legal reasons, etc.). As another example, if a user logs into an account that they hold with an identity provider (IDP), it can be desirable to avoid letting the IDP (or compute device(S) thereof) have access to the plaintext/unencrypted version of the sensor data (e.g., for security reasons, for privacy reasons, for legal reasons, etc.).

Accordingly, techniques described herein can facilitate increased (e.g., end to end) security for scenarios in which a user, via their user compute device, requests to access sensor data captured by one or more sensors. For example, in some embodiments, using a combination of key encryptions, key decryptions, and key rotations across multiple compute devices, only the user's compute device is able to decrypt an encrypted version of the sensor data.

In some implementations, a "customer secret key" refers to a key associated with a customer/user of an organization. For example, the customer secret key can be (optionally uniquely) associated with a user account requesting access to view video captured by a sensor.

In some implementations, a "media key" refers to a key associated with sensor data, such as video captured by a camera. A camera may capture multiple different videos, and each video can be associated with a unique media key from a set of media keys.

In some implementations, a "camera key" refers to a key associated with (e.g., that uniquely identifies) a camera. For example, the camera may have captured video that a customer/user of the organization would like to access.

In some implementations, an "organization master key" refers to a key associated with an organization. For a service provider that provides access to sensor data to various organizations, each organization can be associated with a unique organization master key from a set of organization master keys.

In some implementations, an "encrypting version of" a key refers to a symmetric key or a public version of the key. In some implementations, a "decrypting version of" a key refers to a symmetric key or a private version of the key. In some implementations, a "plaintext version of" a key refers to unencrypted data (e.g., an unencrypted version of the key).

In some implementations, a "document" refers to a string of bytes containing a serialization of data structures, signals, strings, byte strings, responses, messages, payloads, data structures, files and/or the like. Alternatively or in addition, in some implementations, a "document" can refer to a file, a JSON document, an XML document, or a binary serialized document.

In some implementations, an "access token" includes the security credentials for a login session and identifies the user, the user's groups, the user's privileges, a particular application, and/or the like. The access token can include indication of an identifier of the access token, identifier of the associated logon session, user identifier, identifier of groups the user is part of, restricting group identifier, privileges, default owner, user attributes, and/or the like. The access token can be, for example, a bearer token or a sender-constrained token.

In some implementations, an administrative user ("admin") (e.g., of a service provider that manages who can access video captured by one or more cameras) creates a representation of an organization at a first time and initializes a camera (e.g., at a remote location) via a distributed collection of servers ("the cloud") at a second time after the first time (e.g., the admin is not physically present with the camera, or is not in close physical proximity to the camera). The organization can include a user or group of users that may desire to view the video captured by the camera(s). The camera(s) captures video and encrypts the video at a third time after the second time. The admin creates a trust relationship with a single sign on (SSO) provider (e.g., using a certificate that is exchanged between the admin and the SSO provider) at a fourth time after the third time. The admin assigns permission to an SSO group to view video captured by the camera at a fifth time after the fourth time. The SSO group can include, e.g., all users who are part of the organization, a subset of users who are part of the organization, only users in the organization that have a security clearance, only users in the organization that are located in a particular region, etc. Using their compute device, the admin and/or human resource management (HRM) adds the user(s) to the SSO group in an identity provider (IDP) system entity, and a replication of the user and group information is performed by the IDP using a standard for user identity information exchange between identity domains and/or IT systems (e.g., the system for cross-domain identity management (SCIM) specification) at a sixth time after the fifth time. A user at the organization uses SSO to sign in at a seventh time after the sixth time. The user, once successfully signed in, can decrypt the video that was encrypted at the third time on a web browser of their compute device at an eighth time after the seventh time.

In the aforementioned scenario, various threats can exist. For example, the cloud may be compromised and the video can subsequently be accessible/viewed via the compromised cloud. As another example, a non-user attacker with physical access to the camera can try to watch the video. As another example, an attacker with access to the browser memory can attempt to view the video even after the user's credentials or permissions have become invalid. Embodiments set forth herein can mitigate and/or eliminate the aforementioned threats.

Client-side encryption can be performed using various techniques. For example, if a user has a passphrase, data uploaded to a browser of the user's compute device for viewing may first be encrypted with the passphrase. The user's compute device can decrypt the data using the passphrase so that the user can view/access an unencrypted/decrypted version of the data. As another example, an organization can have a common passphrase for users in the organization (e.g., an organization master key), and a camera that captures video can be associated with a public key. A browser of a user's compute device can generate a camera keypair. The video's private key may be encrypted with the passphrase, and the user's compute device can download the private key, decrypt the video with the passphrase, and access the sensor data.

Unlike known techniques described below, some embodiments of the present disclosure are related to client side encryption using, for example, OpenID Connect (OIDC) identity provider (IDP). For example, some known techniques for client side encryption use a REST API "key service" provided by a third party. In some instances, that third party can host one or more encrypt/decrypt APIs and independently has a user login (e.g., to a third-party platform) with a customer's IDP. These techniques can involve the use of a separate setup/contract with the third party, and may optionally include a hierarchy driven by customer requirements. Such techniques also maintain some sensitive data in an unencrypted form.

Other known techniques are similar, but involve the use of a user email and passphrase (no SSO), and generally function more like a peer-to-peer (P2P) model.

Some known techniques include the use of password managers. Wallets can be identified by unguessable identifiers and encrypted by one or more user passphrases. The wallets can be shared using multiple encryption keys. System for Cross-domain Identity Management (SCIM) support can involve an organization running a server on the organization's own infrastructure and making that server the target of the IDP call. That server effectively has a passphrase for all wallets, which it uses to add users, and which can be undesirable.

Some known techniques use client side Diffie-Hellman (DH) key exchange for encrypted video conferencing. In these known techniques, the conferencing stream is sometimes encrypted with a key that is simultaneously derived at each client by performing an online DH exchange between clients. In these known techniques, the secrecy of the key exchange is sometimes assured through use of signature validation against known keys associated with user accounts. For these known techniques, however, the clients are sometimes reliant on the service provider to provide the user's true and unaltered public keys. These known techniques sometimes use a "trust on first use" model (e.g., the first person to register with the identity wins). These known techniques sometimes use signature chains (e.g., blockchain) to show that except for the first login, another party other than the users did not forge keys. For these known techniques, however, the DH exchange takes place after the clients have established a two-way connection, such that encryption using the derived key is delayed until both clients are connected. Furthermore, for these known techniques, provisioning of the user accounts for the sending and receiving clients precede validation of the DH exchange.

Some known techniques allow clients to verify the identity of an end-user based on an authentication performed by an authorization server such as Okta®, Azure® Active Directory, and/or the like. Some of these known techniques use a login token and an access token. The login token can be, for example, a cryptographically encoded token used for authentication. The login token can be generated by an identity provider (IDP), such as Okta®, Azure® Active Directory, and/or the like, and the relying party (RP)—an application that delegates its authentication process to the IDP—can use this login token to validate the identity of the client. The login token is thus associated with the authentication workflow. In some known techniques, a login token is a JSON Web Token (JWT) that contains claims about the authentication of an end-user.

On the other hand, the access token can be used in some known techniques, for example, to access resources. The access token can include authorization claims, associating the access token with the authorization workflow. Access tokens can act as bearer tokens, allowing the bearer to access authorized resources without further identification. For example, for a user logging into Zoom® using Gmail®, Zoom® might request permission to access the user's calendar and other information. In this case, Zoom® might use the access token as a bearer token to gain the necessary access from Gmail®.

For first-party scenarios, however, an access token may not be needed. For example, when applications are developed and user accounts are managed by the same entity, there is an inherent trust that can make authorization tokens unnecessary. In such a setup, the backend service already has direct access to user data and resources upon user authentication. Accordingly, some embodiments of the present disclosure use proxy re-encryption and the splitting of private keys to securely share an encrypted organization's secret between a compute device of an admin of the organization, and the compute device(s) of multiple new users of the organization by using the backend as the broker. On the admin compute device's browser, a symmetric key (S_key) for encrypting the organization's secrets (e.g., public-private key pairs generated on the admin's browser) and the admin's public-private key pair (A_pub, A_priv) can be generated. A_pub can be used to encrypt S_key. In some implementations, this encrypted symmetric key (E_S_key) can only be decrypted with A_priv. E_S_key can be sent from the admin's compute device to the backend for storage, ready to be re-encrypted and shared with any new users' compute devices in a secure manner.

In some embodiments, new user key pairs can be created via the admin compute device's browser without backend involvement, and can be split into two parts—Part A can be shared with the backend (e.g., a key management compute device), and Part B can be securely transmitted via, for example, an OpenID Connect (OIDC) (or any other authentication protocol) access token claim to the new user compute device's browser/application. A similar approach can be taken for A_priv. During this process, proxy re-encryption keys can also be generated via the admin compute device's browser and shared with the backend. When a new user logs in using, for example, OIDC, their device can receive Part B as their claim from OIDC, and combine it with Part A from the backend to reconstruct their private key. The backend can then re-encrypt the E_S_key using the pre-shared proxy re-encryption key and send it to the new user's compute device, which decrypts it with the reconstructed private key. The new user's compute device can then access and decrypt the organization's secrets using the S_key.

In some implementations, a proxy re-encryption algorithm/process (see, e.g., Hu, Vincent C. *Overview and Considerations of Access Control Based on Attribute Encryption.* 2023, nvlpubs.nist.gov/nistpubs/ir/2023/NIST.IR.8450.pdf, https://doi.org/10.6028/nist.ir.8450. Accessed 20 Nov. 2023., the entire contents of which are incorporated by reference herein) can be used to transfer the S_key from an admin's compute device to a new user's compute device in the organization by combining the A_priv and the public key of the new user to create a proxy re-encryption key. This proxy re-encryption key can facilitate a transformation of the E_S_key such that only a new user's compute device can decrypt it using their private key, keeping S_key protected during the transfer and preventing the backend from accessing this key. These secret keys can be used to encrypt the camera's private keys or any other keys that are used for encrypting the organization's graphics/media.

Example Workflow

1. A browser of an admin's compute device generates the organization's secrets and a symmetric key (S_key) for encrypting and decrypting the organization's secrets.
2. A public/private key pair (A_pub, A_priv) for the admin's compute device is generated on the browser of the admin compute device.
3. S_key is encrypted using the A_pub, and the encrypted S_key (E_S_key) is shared with the backend (e.g., key management compute device 160 in FIG. 1, discussed below), which stores it along with the encrypted organization's secrets.
4. For each potential new user from the organization, a public/private key pair (N_pub, N_priv) is generated. N_priv is split into two parts: Part A and Part B. The admin compute device keeps Part B, and N pub and Part A are shared with the backend, along with an identifier (ID) for that "new user." A similar approach is taken for A_priv.
5 Along with sharing new user's public key and Part A of their private key with backend, a re-encryption key generated using A_priv and the new user's public key (N_pub) is shared with the backend.
6. Admin includes Part B of each new user's private key as a custom attribute in, for example, the OIDC assertion, which will be available on the respective new user compute device's browser/application during the SSO process. This can be a one-time process for the admin and the only step that happens outside the browser.

Example Workflow when a New User Logs in

1. The new user logs in using, for example, OIDC (or any other identity provider) and the browser of the new user's compute device (e.g., user compute device 120 in FIG. 1, discussed below) receives the OIDC assertion containing Part B of their private key.
2. The backend sends Part A of the new user's private key through a secure channel or encrypted message.
3. The new user combines Part A and Part B to reconstruct their complete private key-N priv.
4. The backend uses the stored re-encryption key to re-encrypt E_S_key and sends the re-encrypted S_key (RE_S_key) to the new user's compute device.
5. The new user's compute device uses their reconstructed private key (N_priv) to decrypt RE_S_key and obtain S_key.
6. The new user's compute device requests the encrypted organization's secrets from the backend and uses the S_key to decrypt them.

In the foregoing approach, the admin's compute device shares the re-encryption key with the backend in advance, and the backend stores the re-encryption key along with the public key and Part A of each potential new user's private key. This allows the backend to re-encrypt the S_key as soon as a new user requests access to the organization's secrets.

A variety of advantages are provided by techniques described herein. Examples of these advantages include (but are not limited to):

1. Admin Independence: Enables on-demand access (e.g., of sensor data) for new users without requiring real-time action from the admin.
2. No Individualized Security Codes: Avoids the need for individual security codes for each new user by leveraging, for example, OIDC assertions to store Part B.
3. Scalability: Accommodates an increasing number of users without significant changes to the system architecture.
4. Enhanced Security: Splitting the private key between the server and the client enhances security by ensuring no single entity (e.g., other than the user/customer and/or a compute device thereof) can access the full key.
5. Prevention of Unauthorized Access: Proxy re-encryption ensures the backend cannot decrypt the organization's secrets and symmetric key on its own.
6. Integration with Existing SSO: Can be seamlessly integrated with existing SSO solutions such as Okta®, Azure® Active Directory, and Active Directory Federation Services®.
7. Non-Interactive Key Distribution: The key distribution process doesn't require any interaction between the new user and the admin, simplifying the process for both parties.

Key Rotation Example

1. Generate a new symmetric key (New_S_key): This could be done in the admin compute device's browser, similar to how the S_key was generated.
2. Fetch keys from the backend: On the admin compute device's browser, fetch the encrypted symmetric key (E_S_key) and the encrypted organization's secrets from the backend.

3. Decrypt E_S_Key: On the browser of the admin compute device, use the admin's A_priv to decrypt the E_S_key and get the S_key.
4. Decrypt the organization's secrets: The admin compute device uses the S_key to decrypt the organization's secrets.
5. Re-encrypt the organization's secrets: The admin compute device uses the New_S_key to encrypt the organization's secrets.
6. Send the newly encrypted organization's secrets to the backend: The backend will replace the previous encrypted organization's secrets with the newly encrypted ones.
7. Update the encrypted symmetric key (E_S_key) stored on the backend: The admin's compute device encrypts New_S_key with the admin's public key (A_pub), similar to the original process, and send the new encrypted symmetric key (New_E_S_key) to the backend to replace the old E_S_key.
8. Re-encrypt New_E_S_key for each NewUser: The admin's compute device uses the stored re-encryption keys to re-encrypt New_E_S_key for each NewUser, similar to the original process.
9. Notify the NewUsers about the key rotation: Once the key rotation is done, all the users in the organization will fetch the new symmetric key (New_S_key). This can be controlled through the backend or frontend (as a retry mechanism).

Sending a Key from a First Computer Device to a Second Compute Device

There are various ways by which a key can be sent from a first compute device to a second compute device. In some implementations, a website on the first compute device displays text that is or includes a representation of the key. A user at the first computer device can copy the text and send the copied text (e.g., via email, via short message service (SMS) text, etc.) to the second computer. The second computer can paste the text value into an input (e.g., an input data field). Additionally or alternatively, a representation of the key can be displayed by the first compute device as a QR code, and the second compute device can capture an image of the QR code to receive the key.

In some implementations, the key is shared using a shared file that is accessible by both the first compute device and the second compute device. For example, the first compute device can include a representation of the key in/add a representation of the key to the shared file, and the second compute device can access the shared file to obtain the key.

In some implementations, a password manager can be used to send a first key from the first compute device to the second compute device. The first key can be saved as a password that both the first compute device and second compute device can have access to.

In some implementations, the first compute device generates a transfer key. The first compute device wraps the first key with the transfer key and saves the wrapped key on the backend. A website accessed via the first compute device displays text that represents the transfer key. The second compute device receives a representation of the text (e.g., via an email, SMS text message, QR code, etc.) from the first compute device. The second compute device then uses the transfer key to receive the wrapped key from the backend, which can enforce policies such as single use only, and unwrap the wrapped key using the transfer key, resulting in the first key.

In some implementations, the first compute device generates a keypair. A website accessed by a browser of, and displayed via a GUI of, the first compute device displays a QR code including a random proxy server uniform resource locator (URL) and a public key (e.g., http://proxy.example.com/exchange/12312312312/ALSADKLJSAD . . . ). The second compute device generates a keypair. A website displayed at the second compute device displays a QR code including the same random proxy server URL and a different, random public key. A third compute device receives one or both of the QR codes from the first and/or second compute device (e.g., by capturing an image thereof using a camera of the third compute device) and performs Diffie-Hellman cryptographic key exchange with the first compute device and the second compute device. The third compute device then generates a shared key, and from the shared key derives a code (e.g., a hash or checksum manifested as a short verification 'codeword', a number (e.g., a 6-digit number), etc., which is optionally displayed), encrypts the shared key using a public key associated with the first compute device, encrypts the shared key using a public key associated with the second compute device, sends the shared key encrypted using the public key associated with the first compute device to the first compute device, and send the shared key encrypted using the public key associated with the second compute device to the second compute device. Thereafter, each of the first and second compute devices decrypts their associated received encrypted shared key, to obtain the shared key. The third compute device compares the derived codes (e.g., the first and second compute devices display their respective derived codes and the third compute device captures an image of both) to ensure that the Diffie-Hellman exchange was not intercepted. The first compute device then sends the key to the third compute device using their shared key, and the third compute device sends the key to the second compute device using their shared key. Alternatively, the first and second compute devices have the shared key and other compute devices do not. The second compute now has the first compute device's key, which was displayed by the first compute device, even if the second compute device does not have a camera interface. The third compute device can now share the first compute device's key to other computers (e.g., via scanning).

In some embodiments (referred to herein as "inbox approval flow"), the first compute device generates or loads a previously generated admin keypair. The second compute device generates a setup keypair. A user at the second compute device or the second compute device itself verifies the admin keypair, for example by inspecting a sequence of numbers or words that comprise a "fingerprint." The second compute device encrypts the public key and context (e.g., computer name, location, reason for request) to the admin keypair, and sends the public key and context to the backend where the public key (and, optionally, the context) is placed in an administrator approval queue. Later, a user at the first compute device receives and decrypts the public keys in the approval queue. The decrypted public keys are displayed at the first compute device via a user interface of pending tasks, such as an inbox. The user then verifies that the public keys were not intercepted by inspecting the context. The first compute device then encrypts the key to each setup keypair public key in the queue and uploads the result to the backend. Later, the second compute device receives the wrapped key (the key encrypted by the first compute device to each setup keypair public key in the queue) and decrypts it using the setup keypair private key. In one variation, push notifications may be used instead of an inbox (e.g., to reduce setup time). In some implementations, a "reason for request" can be text provided by the requesting user that may be unknowable by the backend. For example, the reason for request can be "Just hired. Need access to the cameras in Building 4." This context can provide data that the administrator can verify as true using a channel unviewable by the backend (e.g., general knowledge, practical intuition, organizational context such as departments or IP addresses associated with legitimate requests, etc.).

In some implementations, a user at the first compute device (or the compute device itself) registers a FIDO universal $2^{nd}$ factor (FIDO/U2F) token (e.g., Yubikey®), but instead of registering to the backend, it registers to the frontend itself. The registration process results in the generation of a value called a verifier. A user with the FIDO/U2F token at the second compute device can use the FIDO/U2F token to sign in to the first compute device by sending values indicating that the first compute device can use the verifier to verify in lieu of context. This process is an extension of the inbox approval flow, but does not involve user interaction at the first compute device to verify that the request was initiated by a user with the FIDO/U2F token. This process can be made live and/or be performed automatically by using a proxy to have incoming requests handled immediately by the first compute device. In some implementations, the verifier and admin keypair can be replicated to every compute device that has the key, and any of the compute devices (e.g., not just the first compute device) can automatically respond.

In some implementations, an enclave (e.g., Nitro Enclave, Intel SGX, Confidential Computing, etc.) is present in the backend. The enclave can have tamper-proofing that prevents it from being maliciously inspected or modified by insiders and/or hackers. The second compute device encrypts the account login information to the enclave keypair at the application layer to hide the account login information from the backend that exists around the enclave and between the enclave and the second compute device. The enclave processes the login verification without revealing the login verification to the backend. The second compute device also sends a key transfer key (KTK). If a login is successful, the enclave encrypts the key to the KTK and returns the encrypted key to the second compute device. In one variation, instead of the enclave running inside the backend, the enclave can instead run on a customer device (e.g., a camera through a proxy).

In some embodiments, a software application runs in a web browser of a user compute device (e.g., user compute device 120 in FIG. 1). The user compute device receives an identity token from an IDP (i.e., a login server) and the IDP performs one or more login checks of the user. The user compute device further receives an application data response from the IDP containing a customer secret key (or an organizational IDP secret). If the application data response (or its content(s)) is different than the customer secret key, the user compute device receives an encrypted organization master key from a key management compute device (or a master key server) and decrypts the encrypted organization master key using the customer secret key; otherwise, the organization master key can be used to refer to the customer secret key (without allowing the key management compute device access to any of these unencrypted keys). As used herein, the web browser can be referred to, for example, as a "frontend," and the key management compute device can be referred to, for example, as a "backend."

The user compute device further receives encrypted sensor data (e.g., video) from the sensor that captured that sensor data or from another device or storage (without allowing sensor, proxy, or storage component access to any of the unencrypted keys), which may have been encrypted at a time before the user existed (e.g., before the first possible time that the user could have successfully completed the login). The user compute device receives the media key encrypted to a camera key (or a recipient key) without allowing the sensor or any proxy or storage component access to any unencrypted keys. The user compute device further receives the encrypted camera key from the key management compute device without allowing the key management compute device access to any unencrypted keys. In some variations, the encrypted camera key is received subject to access controls related to the user(s), known by their identity token (such access controls including, e.g., rate limiting, user group restrictions, location restrictions, job title restrictions, time expiration, etc.). The user compute device decrypts the encrypted camera key using the organization master key, decrypts the encrypted media key with the camera key, decrypts the sensor data, and renders the sensor data to a user interface.

In some embodiments, a software application runs in a web browser of a user compute device. The user compute device receives an identity token from an IDP after the IDP performs one or more login checks. The user compute device further receives an application data response from the login server containing a customer secret key. If different than the customer secret key, the user compute device receives an encrypted organization master key and decrypts the organization master key with the customer secret key; otherwise, the organization master key is used to refer to the customer secret key (without allowing a key management compute device access to any of these unencrypted keys). The user compute device generates a keypair for a sensor (e.g., a camera key) and encrypts a private version of the camera key using the organization master key. The user compute device sends the encrypted camera key to the key management compute device (without allowing the key management compute device access to any of these unencrypted keys). The user compute device causes the sensor to use a public version of the camera key as a recipient key (e.g., via an authorized, authenticated request to the provisioning server; for encrypting a media key).

In some embodiments, a sensor (e.g., a camera) is configured to collect/generate time-correlated sensor data (e.g., in a digital format). The sensor generates a symmetric media key. The sensor encrypts the sensor data using the symmetric media key. The sensor receives and stores a camera public key or recipient public key (in some implementations via the cloud with access controls; in some implementations to be cryptographically verified by the camera as coming from a camera registration process/software application that 'knows' (e.g., stores) and/or has access to the organization master key; in some implementations, the sensor encrypts the media key using a public version of the camera key or encrypts the media key to the recipient public key).

In some embodiments, a software application runs in a web browser of a user compute device. The user compute device receives an identity token from an IDP (or other login server) after the IDP performs one or more login checks. The user compute device generates a new customer secret key (or organization master key) and renders it into a copyable format. If the new customer secret key is different than the customer secret key (or organization master key), the user compute device generates an organization master key and encrypts it with the customer secret key (or organization master key) without allowing a key management compute device access to any of these unencrypted keys). The user compute device provides instructions for transferring the copyable formatted data to the IDP such that the copyable formatted data can be present in a future application data response.

According to one or more embodiments of the present disclosure, a user compute device (e.g., user compute device 120) can access encrypted sensor data (e.g., sensor data 106) without an administrator's compute device being online at the same time as the user compute device, without the user compute device being online at the same time as the sensor associated with the sensor data, without the user compute device communicating directly with the administrator's compute device, and/or without user compute device being in physical proximity to, or not on the same shared network as, the administrator's compute device. This ability of a user compute device to access sensitive, encrypted sensor data without being online concurrently with the administrator's compute device (e.g., asynchronously) is made possible by the end-to-end encryption systems and methods described herein, and is facilitated, by way of example, by one or more of: the receiving, at a processor, of a first document and a second document from a first compute device, the first document including a first version of a first key and the second document including a representation of a login token; the use of an encrypted second key that is encrypted by a second version of the first key; or the use of encrypted sensor data that has been encrypted by a plaintext second key. The ability of a user compute device to access sensitive, encrypted sensor data without being online concurrently with the administrator's compute device provides the user compute device with increased flexibility (relative to known methods) regarding when, where, and how the sensor data is accessed while maintaining privacy of the sensor data.

Moreover, challenges unique to sensors (such as cameras) are addressed and overcome by one or more embodiments described herein. For example, sensor challenges can include: limited computing resources compared to personal computers (e.g., laptops or desktops), limited battery life (e.g., due to size constraints of the sensor, such as having a small form factor), inability to run intensive encryption or cybersecurity algorithms (e.g., due to limited processing power as compared to personal computers), intermittent periods of operation (e.g., during a cloudy day or during the evening when powered by solar energy), unreliable network connections (e.g., due to being in a remote location with spotty/unreliable service), and/or the like. These challenges are addressed, according to some embodiments, by end-to-end encryption systems and methods described herein, for example since, as discussed above, end-to-end encryption (and subsequent decryption) can be executed without requiring the sensor or user compute device to be online at the same time, as previously discussed. Moreover, the increased flexibility regarding when, where, and how the sensor data is accessed can be beneficial in situations where sensors (e.g., cameras) have limited storage capabilities, since the sensor data can offloaded from the sensors under a variety of circumstances, including when an administrator compute device and/or user compute device is not online and when the sensors are experiencing intermittent network connectivity. As another example, in circumstances where multiple sensors (e.g., cameras) are attempting to, or are configured to, offload sensor data to a common location (e.g., a centralized compute device (e.g., key management compute device 160) or a user compute device (e.g., user compute device 120)), bandwidth challenges may arise. These bandwidth challenges can be at least partly ameliorated due to the flexibility discussed above regarding when, where, and how the sensor data is accessed.

In some implementations, the ability to access and/or decrypt encrypted sensor data is limited to the user compute device. Said differently, in some implementations, other compute devices (e.g., key management compute device 160, identity provider compute device 140, and/or sensor 100 in FIG. 1) cannot individually decrypt (or are prohibited from decrypting) the encrypted sensor data. This provides increased security of the sensor data, and can be desirable for privacy and cybersecurity reasons. For example, even if a key management compute device or identity provider compute device is hacked, the hacker will not be able to decrypt an encrypted version of the sensor data. Limiting the ability to decrypt encrypted sensor data to only the user compute device can also be desirable when end-to-end encryption is performed wirelessly, via a communications network and across/among remote compute devices, since communications networks can be susceptible/vulnerable to cyber-attacks.

System Diagram

FIG. 1 shows a system block diagram to perform end to end encryption, according to an embodiment. FIG. 1 includes sensor 100, user compute device 120, identity provider compute device 140, and key management compute device 160, each communicatively coupled to one another via network 180.

Network 180 can be any suitable communications network for transferring data, for example, operating over public and/or private communications networks. For example, network 180 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, network 180 can be a wireless network such as, for example, a Wi-Fi® or wireless local area network ("WLAN"), a wireless wide area network ("WWAN"), and/or a cellular network. In other instances, the network 180 can be a wired network such as, for example, an Ethernet network, a digital subscription line ("DSL") network, a broadband network, and/or a fiber-optic network. In some instances, network 180 can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via network 180 can be encrypted or unencrypted. In some instances, the network 180 can include multiple networks or subnetworks operatively coupled to one another by, for example, network bridges, routers, switches, gateways and/or the like.

Sensor 100, user compute device 120, identity provider compute device 140, and key management compute device 160 can each include a processor operatively coupled to a memory (e.g., via a system bus). Sensor 100 includes processor 102 operatively coupled to memory 104, user compute device 120 includes processor 122 operatively coupled to memory 124, identity provider compute device 140 includes processor 142 operatively coupled to memory 144, and key management compute device 160 includes processor 162 operatively coupled to memory 164.

Processor 102, 122, 142, and/or 162 can be, for example, a hardware-based integrated circuit (IC) or any other suitable processing device configured to run and/or execute a set of instructions or code. For example, processor 102, 122, 142, and/or 162 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, processor 102, 122, 142, and/or 162 can be configured to run any of the methods and/or portions of methods discussed herein.

Memory 104, 124, 144, and/or 164 can be, for example, a random-access memory (RAM), a memory buffer, a hard drive, a read-only memory (ROM), an erasable programmable read-only memory (EPROM), and/or the like. Memory 104, 124, 144, and/or 164 can be configured to store any data used by processor 102, 122, 142, and/or 162, respectively, to perform the techniques (methods, processes, etc.) discussed herein. In some instances, memory 104, 124, 144, and/or 164 can store, for example, one or more software programs and/or code that can include instructions to cause processor 102, 122, 142, and/or 162, respectively, to perform one or more processes, functions, and/or the like. In some implementations, memory 104, 124, 144, and/or 164 can include extendible storage units that can be added and used incrementally. In some implementations, memory 104, 124, 144, and/or 164 can be a portable memory (for example, a flash drive, a portable hard disk, a SD card, and/or the like) that can be operatively coupled to processor 102, 122, 142, and/or 162, respectively. In some instances, memory 104, 124, 144, and/or 164 can be remotely operatively coupled with a compute device (not shown in FIG. 1). In some instances, memory 104, 124, 144, and/or 164 is a virtual storage drive (e.g., RAMDisk), which can improve I/O speed and in turn, accelerate image reading and writing.

Sensor 100 can be any type of sensor, such as a camera, temperature sensor, proximity sensor, accelerometer, infrared sensor, pressure sensor, light sensor, ultrasonic sensor, smoke sensor, gas sensor, alcohol sensor, touch sensor, color sensor, humidity sensor, position sensor, magnetic sensor, microphone, tilt sensor, flow and level sensor, passive infrared sensor, touch sensor, strain and weight sensor, and/or the like. In some implementations, sensor 100 is a video camera, such as a dome camera, bullet camera, fisheye camera, internet protocol (IP) camera, 4K camera, pan-tilt-zoom (PTZ) camera, Wi-Fi camera, license plate recognition (LPR) camera, and/or the like.

Memory 104 of sensor 100 can include sensor data 106. Sensor data 106 can be sensor data captured by sensor 100. For example, if sensor 100 is a video camera, sensor data 106 can be captured video.

User compute device 120 can be any type of compute device, such as such as a desktop, laptop, tablet, smartphone, and/or the like. In some implementations, user compute device 120 is associated with (e.g., owned by, being used by, accessible by, in the name of, etc.) a user (e.g., a new user, a returning user) that wants to view sensor data 106. For example, the user may use user compute device 120 to create a new account and/or login to an existing account via a browser and request viewing sensor data 106. The user can be, for example, a member of an organization that receives access to sensor data 106 captured by sensor 100. Identity provider compute device 140 and key management compute device 160 can each be any type of compute device, such as such as a server, desktop, laptop, tablet, smartphone, and/or the like.

A user may use user compute device 120 to request a representation of sensor data 106. It can be desirable to have an encrypted version sensor data 106 sent to user compute device 120 so that only user compute device 120 can decrypt and access sensor data 106. User compute device 120, identity provider compute device 140, and/or key management compute device 160 can perform such end to end encryption using various techniques.

Technique One

Sensor 100 can include (e.g., store in memory 104) a representation of an encrypting version of a customer secret key. The encrypting version of the customer secret key could be, for example, a public version of the customer secret key or a symmetric key. In some implementations, the encrypting version of the customer secret key is generated by sensor 100. In some implementations, the encrypting version of the customer secret key is generated by a device different than sensor 100 (e.g., user compute device 120, key management compute device 160, identity provider compute device 140, and/or a compute device not shown in FIG. 1).

Sensor 100 can also include (e.g., store in memory 104) a decrypting version of a media key encrypted by the encrypting version of the customer secret key. The decrypting version of the media key could be, for example, a private version of the media key or a symmetric key. In some implementations, the decrypting version of the media key is generated by sensor 100. In some implementations, the decrypting version of the media key is generated by a device different than sensor 100 (e.g., user compute device 120, key management compute device 160, identity provider compute device 140, and/or a compute device not shown in FIG. 1). The decrypting version of the media key can be encrypted by the encrypting version of the customer secret key after the encrypting version of the customer secret key has been generated by and/or received at sensor 100. The decrypting version of the media key can be encrypted by the encrypting version of the customer secret key by sensor 100, user compute device 120, key management compute device 160, identity provider compute device 140, and/or a compute device not shown in FIG. 1.

Sensor 100 can also include (e.g., store in memory 104) sensor data 106 encrypted by an encrypting version of the media key. The encrypting version of the media key could be, for example, a public version of the media key or a symmetric key. In some implementations, the encrypting version of the media key is generated by sensor 100. In some implementations, the encrypting version of the media key is generated by a device different than sensor 100 (e.g., user compute device 120, key management compute device 160, identity provider compute device 140, and/or a compute device not shown in FIG. 1). In some implementations, the encrypting version of the media key is received at user compute device 120 after a first document and a second document (as discussed herein) have been received at user compute device 120. Sensor data 106 can be encrypted by the encrypting version of the media key after the encrypting version of the media key has been generated by and/or received at sensor 100. Sensor data 106 can be encrypted, using the encrypting version of the media key, by sensor 100, user compute device 120, key management compute device 160, identity provider compute device 140, and/or a compute device not shown in FIG. 1.

In some implementations, a user uses user compute device 120 to request sensor data 106. Requesting sensor data 106 can include, for example, the user using a browser, a native application, a SaaS login page, and/or the like at user compute device 120 to login to their account to request sensor data 106. The login process can include user compute device 120 sending login information (e.g., username, password, biometric, single sign on (SSO) data, and/or the like) to identity provider compute device 140. Identity provider compute device 140 can act/function as an identity provider, and determine whether the login information is legitimate/valid. If identity provider compute device 140 determines that the login information is legitimate/valid, two documents can be sent from identity provider compute device 140 to user compute device 120 (e.g., in parallel and/or in series, as part of the same request or different request).

The first document can include a decrypting version of the customer secret key. The decryption version of the customer secret key could be, for example, a private version of the customer secret key or a symmetric key. In some implementations, the decrypting version of the customer secret key is generated by the identity provider compute device 140. In some implementations, the decrypting version of the customer secret key is generated by a device different than identity provider compute device 140 (e.g., sensor 100, user compute device 120, key management compute device 160, and/or a compute device not shown in FIG. 1). In some implementations, the first document further includes an access token (e.g., a cryptographically signed document used to communicate a privilege(s) conferred to the bearer, sometimes containing the security credentials for a login session, the user's identity, the user's groups, the user's privileges, the user's properties, a particular application, and/or the like).

The second document can include a representation of a login token (i.e., ID token). The login token (and/or the representation of the login token) can allow user compute devices to log in to applications, services, websites, and application programming interfaces (APIs) without having to enter their login credentials each time they visit.

In response to receiving the representation of the login token and the decrypting version of the customer secret key, user compute device 120 can receive (1) sensor data 106 encrypted by the encrypting version of the media key and (2) the decrypting version of the media key encrypted by the encrypting version of the customer secret key. User compute devices 120 can decrypt the decrypting version of the media key encrypted by the encrypting version of the customer secret key using decrypting version of the customer secret key received from identity provider compute device 140 to obtain the decrypting version of the media key. Thereafter, the decrypting version of the media key can be used to decrypt sensor data 106 encrypted by the encrypting version of the media key to obtain sensor data 106. Sensor data 106 can then be, for example, displayed and/or output at a browser of user compute device 120.

In some implementations of technique one, the decrypting version of the customer secret key is not different from the encrypting version of the customer secret key (e.g., customer secret key is symmetric). In some implementations, the decrypting version of the customer secret key is different from the encrypting version of the customer secret key.

In some implementations of technique one, the sensor 100 captures sensor data 106 at a first time, sensor 100 includes (e.g., stores in memory 104) the encrypting version of the customer secret key at a second time after the first time, the first document is received at user compute device 120 at a third time after the second time, and/or the decrypting version of the media key encrypted by the encrypting version of the customer secret key and sensor data 106 encrypted by the encrypting version of the media key is received after the third time.

In some implementations of technique one, the sensor 100 includes (e.g., stores in memory 104) the encrypting version of the customer secret key at a first time, sensor 100 captures sensor data 106 at the first time and/or at a second time after the first time, the first document is received at user compute device 120 at a third time after the second time, and/or the decrypting version of the media key encrypted by the encrypting version of the customer secret key and sensor data 106 encrypted by the encrypting version of the media key is received after the third time.

In some implementations of technique one, sensor data 106 includes sensor data captured at a first time, and sensor data 106 encrypted by the encrypting version of the media key is decrypted using the decrypting version of the media key to obtain sensor data 106 at a second time that is after the first time. Thus, if sensor data 106 is or includes a video, a user compute device 120 may display the video after the video has been captured (e.g., not as a livestream).

Technique Two

Sensor 100 can include (e.g., store in memory 104) a decrypting version of a media key encrypted by an encrypting version of a camera key. The decrypting version of the media key could be, for example, a private version of the media key or a symmetric key. In some implementations, the decrypting version of the media key is generated by sensor 100. In some implementations, the decrypting version of the media key is generated by a device different than sensor 100 (e.g., user compute device 120, key management compute device 160, identity provider compute device 140, and/or a compute device not shown in FIG. 1). The decrypting version of the media key can be encrypted by the encrypting version of the camera key after the encrypting version of the camera key has been generated by and/or received at sensor 100 (e.g., from user compute device 120). The decrypting version of the media key can be encrypted by the encrypting version of the camera key by sensor 100, user compute device 120, key management compute device 160, identity provider compute device 140, and/or a compute device not shown in FIG. 1.

Sensor 100 can also include (e.g., store in memory 104) sensor data 106 encrypted by an encrypting version of the media key. The encrypting version of the media key could be, for example, a public version of the media key or a symmetric key. In some implementations, the encrypting version of the media key is generated by sensor 100. In some implementations, the encrypting version of the media key is generated by a device different than sensor 100 (e.g., user compute device 120, key management compute device 160, identity provider compute device 140, and/or a compute device not shown in FIG. 1). Sensor data 106 can be encrypted by the encrypting version of the media key after the encrypting version of the media key has been generated by and/or received at sensor 100. Sensor data 106 can be encrypted by the encrypting version of the media key by sensor 100, user compute device 120, key management compute device 160, identity provider compute device 140, and/or a compute device not shown in FIG. 1.

In some implementations, a user uses user compute device 120 to request sensor data 106. Requesting sensor data 106 can include, for example, the user using a browser, a native application, a SaaS login page, and/or the like at user compute device 120 to login to their account to request sensor data 106. The login process can include user compute device 120 sending login information (e.g., username, password, biometric, single sign on (SSO) data, and/or the like) to identity provider compute device 140. Identity provider compute device 140 can act as an identity provider, and determine whether the login information is legitimate/valid. If identity provider compute device 140 determines that the login information is legitimate/valid, two documents can be sent from identity provider compute device 140 to user compute device 120 (e.g., in parallel and/or in series, as part of the same request or different request).

The first document can include a decrypting version of the customer secret key. The decrypting version of the customer secret key could be, for example, a private version of the customer secret key or a symmetric key. In some implementations, the decrypting version of the customer secret key is generated by identity provider compute device 140. In some implementations, the decrypting version of the customer secret key is generated by a device different than identity provider compute device 140 (e.g., sensor 100, user compute device 120, key management compute device 160, and/or a compute device not shown in FIG. 1). In some implementations, the first document further includes an access token (e.g., a cryptographically signed document used to communicate a privilege(s) conferred to the bearer, sometimes containing the security credentials for a login session, the user's identity, the user's groups, the user's privileges, the user's properties, a particular application, and/or the like).

The second document can include a representation of a login token (i.e., ID token). The login token (and/or the representation of the login token) can allow user devices to log in to applications, services, websites, and application programming interfaces (APIs) without having to enter their login credentials each time they visit.

In response to receiving the representation of the login token and the decrypting version of the customer secret key, user compute device 120 can receive a decrypting version of the camera key encrypted by an encrypting version of the customer secret key from key management compute device 160. The decrypting version of the camera key could be, for example, a private version of the camera key or a symmetric key. In some implementations, the decrypting version of the camera key is generated by key management compute device 160. In some implementations, the decrypting version of the camera key is generated by a device different than key management compute device 160 (e.g., sensor 100, user compute device 120, identity provider compute device 140, and/or a compute device not shown in FIG. 1). The decrypting version of the camera key can be encrypted by the encrypting version of the customer secret key by sensor 100, user compute device 120, key management compute device 160, identity provider compute device 140, and/or a compute device not shown in FIG. 1.

User compute device 120 can decrypt the decrypting version of the camera key encrypted by the encrypting version of the customer secret key using the decrypting version of the customer secret key received from identity provider compute device 140 to obtain the decrypting version of the camera key.

User compute device 120 can receive (1) sensor data 106 encrypted by the encrypting version of the media key and (2) the decrypting version of the media key encrypted by the encrypting version of the camera key. User compute devices can decrypt the decrypting version of the media key encrypted by the encrypting version of the camera key using the decrypting version of the camera key received from key management compute device 160 to obtain the decrypting version of the media key. Thereafter, the decrypting version of the media key can be used to decrypt sensor data 106 encrypted by the encrypting version of the media key to obtain sensor data 106. Sensor data 106 can then be, for example, displayed and/or output at a browser of user compute device 120.

In some implementations of technique two, key management compute device 160 does not have access to the decrypting version of the customer secret key and/or decrypting version of the media key. Said differently, the decrypting version of the customer secret key and/or the decrypting version of the media key is not generated at or received by key management compute device 160.

In some implementations of technique two, the encrypting version of the camera key is established on sensor 100 at a first time, the first document is received at user compute device 120 at a second time after the first time, the encrypting version of the camera key is received at user compute device 120 at a third time after the second time, the decrypting version of the media key encrypted by encrypting version of the camera key is received at user compute device 120 at a fourth time after the third time, and sensor data 106 encrypted by the encrypting version of the media key is received after the fourth time.

In some implementations of technique two, sensor data 106 includes sensor data captured at a first time, and the sensor data 106 encrypted by the encrypting version of the media key is decrypted using the decrypting version of media key to obtain the sensor data 106 at a second time that is after the first time.

Technique Three

Sensor 100 can include (e.g., store in memory 104) a representation of an encrypting version of a customer secret key. The encrypting version of the customer secret key could be, for example, a public version of the customer secret key or a symmetric key. In some implementations, the encrypting version of the customer secret key is generated by sensor 100. In some implementations, the encrypting version of the customer secret key is generated by a device different than sensor 100 (e.g., user compute device 120, identity provider compute device 140, and/or a compute device not shown in FIG. 1).

Sensor 100 can also include (e.g., store in memory 104) a decrypting version of a media key encrypted by an encrypting version of a camera key. The decrypting version of the media key could be, for example, a private version of the media key or a symmetric key. In some implementations, the decrypting version of the media key is generated by sensor 100. In some implementations, the decrypting version of the media key is generated by a device different than sensor 100 (e.g., user compute device 120, identity provider compute device 140, and/or a compute device not shown in FIG. 1). The decrypting version of the media key can be encrypted by the encrypting version of the camera key after the encrypting version of the camera key has been generated by and/or received at sensor 100 (e.g., from user compute device 120). The decrypting version of the media key can be encrypted by the encrypting version of the camera key by sensor 100, user compute device 120, identity provider compute device 140, and/or a compute device not shown in FIG. 1. In some implementations, the decrypting version of the media key is encrypted by the encrypting version of the camera key to generate the decrypting version of the media key encrypted by the encrypting version of the camera key after the encrypting version of the customer secret key has been generated at and/or received by sensor 100.

Sensor 100 can also include (e.g., store in memory 104) sensor data 106 encrypted by an encrypting version of the media key. The encrypting version of the media key could be, for example, a public version of the media key or a symmetric key. In some implementations, the encrypting version of the media key is generated by sensor 100. In some implementations, the encrypting version of the media key is generated by a device different than sensor 100 (e.g., user compute device 120, identity provider compute device 140, and/or a compute device not shown in FIG. 1). Sensor data 106 can be encrypted by the encrypting version of the media key after the encrypting version of the media key has been generated by and/or received at sensor 100. Sensor data 106 can be encrypted by the encrypting version of the media key by sensor 100, user compute device 120, identity provider compute device 140, and/or a compute device not shown in FIG. 1. In some implementations, sensor data 106 is encrypted by the encrypting version of the media key to generate sensor data 106 encrypted by the encrypting version of the media key after the encrypting version of the customer secret key has been generated at and/or received by sensor 100.

In some implementations, a user uses user compute device 120 to request sensor data 106. Requesting sensor data 106 can include, for example, the user using a browser, a native application, a SaaS login page, and/or the like at user compute device 120 to login to their account to request sensor data 106. The login process can include user compute device 120 sending login information (e.g., username, password, biometric, single sign on (SSO) data, and/or the like) to identity provider compute device 140. Identity provider compute device 140 can act as an identity provider, and determine whether the login information is legitimate/valid. If identity provider compute device 140 determines that the login information is legitimate/valid, two documents can be sent from identity provider compute device 140 to user compute device 120 (e.g., in parallel and/or in series). In some implementations, the first and second documents are received by user compute device 120 (e.g., as part of the same request or different request) after the encrypting version of the customer secret key has been generated at and/or received by sensor 100.

The first document can include a decrypting version of the customer secret key. The decrypting version of the customer secret key could be, for example, a private version of the customer secret key or a symmetric key. In some implementations, the decrypting version of the customer secret key is generated by identity provider compute device 140. In some implementations, the decrypting version of the customer secret key is generated by a device different than identity provider compute device 140 (e.g., sensor 100, user compute device 120, and/or a compute device not shown in FIG. 1). In some implementations, the first document further includes an access token (e.g., a cryptographically signed document used to communicate a privilege(s) conferred to the bearer, sometimes containing the security credentials for a login session, the user's identity, the user's groups, the user's privileges, the user's properties, a particular application, and/or the like). In some implementations, the first document can be received after the encrypting version of the customer secret key has been established (e.g., stored or received) at sensor 100.

The second document can include a representation of a login token (i.e., ID token). The login token (and/or the representation of the login token) can allow user devices to log in to applications, services, websites, and application programming interfaces (APIs) without having to enter their login credentials each time they visit.

User compute device 120 can include (e.g., store in memory 104) a decrypting version of the camera key. The decrypting version of the camera key could be, for example, a private version of the camera key or a symmetric key. In some implementations, the decrypting version of the camera key is generated by sensor 100, user compute device 120, identity provider compute device 140, and/or a compute device not shown in FIG. 1.

User compute device 120 can also include (e.g., store in memory 124) an encrypting version of the camera key. The encrypting version of the camera key could be, for example, a public version of the camera key or a symmetric key. In some implementations, the encrypting version of the camera key is generated by sensor 100, user compute device 120, identity provider compute device 140, and/or a compute device not shown in FIG. 1.

In some implementations, the encrypting version of the camera key can be used as the verifying version of the camera key and the decrypting version of the customer secret key can be used as the signing version of the customer secret key. In response to receiving the representation of the login token and the decrypting version of the customer secret key, user compute device 120 can sign the encrypting version of the camera key using the signing version of the customer secret key. The encrypting version of the camera key signed using the signing version of the customer secret key can be sent from user compute device 120 to sensor 100. Sensor 100 can verify that the encrypting version of the camera key was signed with the signing version of the customer secret key.

Thereafter, user compute device 120 can receive from sensor 100 (1) sensor data 106 encrypted by the encrypting version of the media key and (2) the decrypting version of the media key encrypted by the encrypting version of the camera key. Sensor data 106 can be encrypted by the encrypting version of the media key to generate sensor data 106 encrypted by the encrypting version of the media key and/or the decrypting version of the media key can be encrypted by the encrypting version of the camera key to generate the decrypting version of the media key encrypted by the encrypting version of the camera key by sensor 100, user compute device 120, identity provider compute device 140, and/or a compute device not shown in FIG. 1.

User compute device 120 can decrypt the decrypting version of the media key encrypted by the encrypting version of the camera key using the decrypting version of the camera key to obtain the decrypting version of the media key. Thereafter, the decrypting version of the media key can be used to decrypt sensor data 106 encrypted by the encrypting version of the media key to obtain sensor data 106. Sensor data 106 can then be, for example, displayed and/or output at a browser of user compute device 120.

In some implementations of technique three, key management compute device 160 does not have access to the decrypting version of the customer secret key, decrypting version of the media key, and/or decrypting version of the camera key. Said different, the decrypting version of the customer secret key, the decrypting version of the media key, and/or the decrypting version of the camera key is not generated at or received by key management compute device 160.

In some implementations of technique three, the encrypting version of the camera key is sent to sensor 100 by user compute device 120. In response, sensor 100 can generate the decrypting version of the media key encrypted by the encrypting version of the camera key using the encrypting version of the camera key.

Technique Four

Sensor 100 can include (e.g., store in memory 104) a decrypting version of a media key encrypted by an encrypting version of a camera key. The decrypting version of the media key could be, for example, a private version of the media key or a symmetric key. In some implementations, the decrypting version of the media key is generated by sensor 100. In some implementations, the decrypting version of the media key is generated by a device different than sensor 100 (e.g., user compute device 120, key management compute device 160, identity provider compute device 140, and/or a compute device not shown in FIG. 1). The decrypting version of the media key can be encrypted by the encrypting version of the camera key after the encrypting version of the camera key has been generated by and/or received at sensor 100 (e.g., from user compute device 120). The decrypting version of the media key can be encrypted by the encrypting version of the camera key by sensor 100, user compute device 120, key management compute device 160, identity provider compute device 140, and/or a compute device not shown in FIG. 1.

Sensor 100 can also include (e.g., store in memory 104) sensor data 106 encrypted by an encrypting version of the media key. The encrypting version of the media key could be, for example, a public version of the media key or a symmetric key. In some implementations, the encrypting version of the media key is generated by sensor 100. In some implementations, the encrypting version of the media key is generated by a device different than sensor 100 (e.g., user compute device 120, key management compute device 160, identity provider compute device 140, and/or a compute device not shown in FIG. 1). Sensor data 106 can be encrypted by the encrypting version of the media key after the encrypting version of the media key has been generated by and/or received at sensor 100. Sensor data 106 can be encrypted by the encrypting version of the media key by sensor 100, user compute device 120, key management compute device 160, identity provider compute device 140, and/or a compute device not shown in FIG. 1.

In some implementations, a user uses user compute device 120 to request sensor data 106. Requesting sensor data 106 can include, for example, the user using a browser, a native application, a SaaS login page, and/or the like at user compute device 120 to login to their account to request sensor data 106. The login process can include user compute device 120 sending login information (e.g., username, password, biometric, single sign on (SSO) data, and/or the like) to identity provider compute device 140. Identity provider compute device 140 can act as an identity provider, and determine whether the login information is legitimate/valid. If identity provider compute device 140 determines that the login information is legitimate/valid, two documents can be sent from identity provider compute device 140 to user compute device 120 (e.g., in parallel and/or in series, as part of the same request or different request).

The first document can include a decrypting version of the customer secret key. The decryption version of the customer secret key could be, for example, a private version of the customer secret key or a symmetric key. In some implementations, the decrypting version of the customer secret key is generated by identity provider compute device 140. In some implementations, the decrypting version of the customer secret key is generated by a device different than identity provider compute device 140 (e.g., sensor 100, user compute device 120, key management compute device 160, and/or a compute device not shown in FIG. 1). In some implementations, the first document further includes an access token (e.g., a cryptographically signed document used to communicate a privilege(s) conferred to the bearer, sometimes containing the security credentials for a login session, the user's identity, the user's groups, the user's privileges, the user's properties, a particular application, and/or the like).

The second document can include a representation of a login token (i.e., ID token). The login token (and/or the representation of the login token) can allow user devices to log in to applications, services, websites, and application programming interfaces (APIs) without having to enter their login credentials each time they visit.

In response to receiving the representation of the login token and the decrypting version of the customer secret key, user compute device 120 can receive a decrypting version of an organization master key encrypted by an encrypting version of the customer secret key from key management compute device 160. The decrypting version of the organization master key could be, for example, a private version of the organization master key or a symmetric key. In some implementations, the decrypting version of the organization master key is generated by key management compute device 160. In some implementations, the decrypting version of the organization master key is generated by a device different than key management compute device 160 (e.g., sensor 100, user compute device 120, identity provider compute device 140, and/or a compute device not shown in FIG. 1). The decrypting version of the organization master key can be encrypted by the encrypting version of the customer secret key by sensor 100, user compute device 120, key management compute device 160, identity provider compute device 140, and/or a compute device not shown in FIG. 1.

User compute device 120 can decrypt the decrypting version of the organization master key encrypted by the encrypting version of the customer secret key using the decrypting version of the customer secret key received from identity provider compute device 140 to obtain the decrypting version of the organization master key.

User compute device 120 can also receive a decrypting version of the camera key encrypted by an encrypting version of the organization master key from key management compute device 160.

The decrypting version of the camera key could be, for example, a private version of the camera key or a symmetric key. In some implementations, the decrypting version of the camera key is generated by key management compute device 160. In some implementations, the decrypting version of the camera key is generated by a device different than key management compute device 160 (e.g., sensor 100, user compute device 120, identity provider compute device 140, and/or a compute device not shown in FIG. 1). The decrypting version of the camera key can be encrypted by the encrypting version of the organization master key by sensor 100, user compute device 120, key management compute device 160, identity provider compute device 140, and/or a compute device not shown in FIG. 1.

User compute device 120 can decrypt the decrypting version of the camera key encrypted by the encrypting version of the organization master key using the decrypting version of the organization master key to obtain the decrypting version of the camera key.

User compute device 120 can receive (1) sensor data 106 encrypted by the encrypting version of the media key and (2) the decrypting version of the media key encrypted by the encrypting version of the camera key. User compute device 120 can decrypt the decrypting version of the media key encrypted by the encrypting version of the camera key using the decrypting version of the camera key to obtain the decrypting version of the media key. Thereafter, the decrypting version of the media key can be used to decrypt sensor data 106 encrypted by the encrypting version of the media key to obtain sensor data 106. Sensor data 106 can then be, for example, displayed and/or output at a browser of user compute device 120.

In some implementations of technique four, the encrypting version of the camera key is sent to sensor 100 by user compute device 120. In response, sensor 100 can generate the decrypting version of the media key encrypted by the encrypting version of the camera key using the encrypting version of the camera key.

Technique Five

Sensor 100 can include (e.g., store in memory 104) a representation of an encrypting version of an organization master key. The encrypting version of the organization master key could be, for example, a public version of the organization master key or a symmetric key. In some implementations, the encrypting version of the organization master key is generated by sensor 100. In some implementations, the encrypting version of the organization key is generated by a device different than sensor 100 (e.g., user compute device 120, key management compute device 160, identity provider compute device 140, and/or a compute device not shown in FIG. 1).

Sensor 100 can also include (e.g., store in memory 104) a decrypting version of a media key encrypted by an encrypting version of a camera key. The decrypting version of the media key could be, for example, a private version of the media key or a symmetric key. In some implementations, the decrypting version of the media key is generated by sensor 100. In some implementations, the decrypting version of the media key is generated by a device different than sensor 100 (e.g., user compute device 120, key management compute device 160, identity provider compute device 140, and/or a compute device not shown in FIG. 1). The decrypting version of the media key can be encrypted by the encrypting version of the camera key after the encrypting version of the camera key has been generated by and/or received at sensor 100 (e.g., from user compute device 120). The decrypting version of the media key can be encrypted by the encrypting version of the camera key by sensor 100, user compute device 120, key management compute device 160, identity provider compute device 140, and/or a compute device not shown in FIG. 1. In some implementations, the decrypting version of the media key is encrypted by the encrypting version of the camera key to generate the decrypting version of the media key encrypted by the encrypting version of the camera key after the encrypting version of the customer secret key has been generated at and/or received by sensor 100.

Sensor 100 can also include (e.g., store in memory 104) sensor data 106 encrypted by an encrypting version of the media key. The encrypting version of the media key could be, for example, a public version of the media key or a symmetric key. In some implementations, the encrypting version of the media key is generated by sensor 100. In some implementations, the encrypting version of the media key is generated by a device different than sensor 100 (e.g., user compute device 120, key management compute device 160, identity provider compute device 140, and/or a compute device not shown in FIG. 1). Sensor data 106 can be encrypted by the encrypting version of the media key after the encrypting version of the media key has been generated by and/or received at sensor 100. Sensor data 106 can be encrypted by the encrypting version of the media key by sensor 100, user compute device 120, key management compute device 160, identity provider compute device 140, and/or a compute device not shown in FIG. 1. In some implementations, sensor data 106 is encrypted by the encrypting version of the media key to generate sensor data 106 encrypted by the encrypting version of the media key after the encrypting version of the customer secret key has been generated at and/or received by sensor 100.

In some implementations, a user uses user compute device 120 to request sensor data 106. Requesting sensor data 106 can include, for example, the user using a browser, a native application, SaaS login page, and/or the like at user compute device 120 to login to their account to request sensor data 106. The login process can include user compute device 120 sending login information (e.g., username, password, biometric, single sign on (SSO) data, and/or the like) to identity provider compute device 140. Identity provider compute device 140 can act as an identity provider, and determine whether the login information is legitimate/valid. If identity provider compute device 140 determines that the login information is legitimate/valid, two documents can be sent from identity provider compute device 140 to user compute device 120 (e.g., in parallel and/or in series). In some implementations, the first and second documents are received by user compute device 120 (e.g., as part of the same request or different request) after the encrypting version of the customer secret key has been generated at and/or received by sensor 100.

The first document can include a decrypting version of the customer secret key. The decryption version of the customer secret key could be, for example, a private version of the customer secret key or a symmetric key. In some implementations, the decrypting version of the customer secret key is generated by identity provider compute device 140. In some implementations, the decrypting version of the customer secret key is generated by a device different than identity provider compute device 140 (e.g., sensor 100, user compute device 120, key management compute device 160, and/or a compute device not shown in FIG. 1). In some implementations, the first document further includes an access token (e.g., a cryptographically signed document used to communicate a privilege(s) conferred to the bearer, sometimes containing the security credentials for a login session, the user's identity, the user's groups, the user's privileges, the user's properties, a particular application, and/or the like). In some implementations, the first document can be received after the encrypting version of the organization master key has been established (e.g., stored or received) at sensor 100.

The second document can include a representation of a login token (i.e., ID token). The login token can allow user devices to log in to applications, services, websites, and application programming interfaces (APIs) without having to enter their login credentials each time they visit.

In response to receiving the representation of the login token and the decrypting version of the customer secret key, user compute device 120 can receive a decrypting version of the organization master key encrypted by an encrypting version of the customer secret key from key management compute device 160. The decrypting version of the organization key could be, for example, a private version of the organization master key or a symmetric key. In some implementations, the decrypting version of the organization key is generated by sensor 100, user compute device 120, identity provider compute device 140, key management compute device 160 and/or a compute device not shown in FIG. 1. The decrypting version of the organization master key can be encrypted by the encrypting version of the customer secret key by sensor 100, user compute device 120, key management compute device 160, identity provider compute device 140, and/or a compute device not shown in FIG. 1.

User compute device 120 can decrypt the decrypting version of the organization master key encrypted by the encrypting version of the customer secret key using the decrypting version of the customer secret key to obtain the decrypting version of the organization master key.

User compute device 120 can include (e.g., store in memory 104) a decrypting version of the camera key. The decrypting version of the camera key could be, for example, a private version of the camera key or a symmetric key. In some implementations, the decrypting version of the camera key is generated by sensor 100, user compute device 120, identity provider compute device 140, key management compute device 160 and/or a compute device not shown in FIG. 1.

User compute device 120 can also include (e.g., store in memory 124) an encrypting version of the camera key. The encrypting version of the camera key could be, for example, a public version of the camera key or a symmetric key. In some implementations, the encrypting version of the camera key is generated by sensor 100, user compute device 120, identity provider compute device 140, key management compute device 160 and/or a compute device not shown in FIG. 1.

User compute device 120 can sign the encrypting version of the camera key using the decrypting version of the organization master key. The encrypting version of the camera key signed using the encrypting version of the organization master key can be sent from user compute device 120 to sensor 100.

Thereafter, sensor 100 can verify the encrypting version of the camera key signed using the encrypting version of the organization master key using the encrypting version of the organization master key. In response to the verifying by sensor 100, user compute device 120 can receive from sensor 100 (1) sensor data 106 encrypted by the encrypting version of the media key and (2) the decrypting version of the media key encrypted by the encrypting version of the camera key. Sensor data 106 can be encrypted by the encrypting version of the media key to generate sensor data 106 encrypted by the encrypting version of the media key and/or the decrypting version of the media key can be encrypted by the encrypting version of the camera key to generate the decrypting version of the media key encrypted by the encrypting version of the camera key by sensor 100, user compute device 120, key management compute device 160, identity provider compute device 140, and/or a compute device not shown in FIG. 1.

User compute device 120 can decrypt the decrypting version of the media key encrypted by the encrypting version of the camera key using the decrypting version of the camera key to obtain the decrypting version of the media key. Thereafter, the decrypting version of the media key can be used to decrypt sensor data 106 encrypted by the encrypting version of the media key to obtain sensor data 106. Sensor data 106 can then be, for example, displayed and/or output at a browser of user compute device 120.

In some implementations of technique five, the encrypting version of the camera key is sent to sensor 100 by user compute device 120. In response, sensor 100 can generate the decrypting version of the media key encrypted by the encrypting version of the camera key using the encrypting version of the camera key.

Note that the techniques described above with reference to FIG. 1 are not limiting, and other variations can exist. For example, while some techniques were performed using just two keys (customer secret key and media key), just three keys (customer secret key, media key, and camera key), or just four keys (customer secret key, media key, camera key, and organization master key), other implementations can use more keys. For example, like how technique three added an extra "key rotation" from technique two through the usage of the organization master key encrypted by the customer secret key, any additional "key rotations" can occur, such as modifying technique three to instead have a fifth key be encrypted by the customer secret key and the organization master key be encrypted by the fifth key.

In some implementations of technique one, two, three, four, and/or five, sensor data 106 encrypted by the encrypting version of the media key can be stored in a remote device instead of sensor 100. For example, after sensor 100 has generated sensor data 106 encrypted by the encrypting version of the media key, sensor data 106 encrypted by the encrypting version of the media key can be saved, for example, in a cloud database or a different sensor(s),user device(s), or network-connected compute device(s), in a centralized or peer-to-peer (P2P) manner until requested by/sent to user compute device 120.

In some implementations of technique one, two, three, four, and/or five, sensor 100 and user compute device 120 communicate via a media proxy compute device. In some implementations, the media proxy compute device can perform transformations to improve client compatibility, perform caching or storage to improve performance or implement multiplexing to improve efficiency by receiving the sensor data (e.g., sensor data 106) once from the sensor (e.g., sensor 100) and then sending a new copy of the sensor data to each receiving user compute device (e.g., user compute device 120).

In some implementations of technique one, two, three, four, and/or five, sensor 100 and user compute device 120 communicate directly (e.g., not via a media proxy compute device), for example, when both sensor 100 and user compute device 120 are on a local network. Sometimes firewalls, network outages or poor connectivity would otherwise prevent such communication. In those cases, the access control to the video is not performed at the media proxy and instead at sensor 100 and/or user compute device 120.

In some implementations of technique one, two, three, four, and/or five, the access token and/or representation of the login token can be received at user compute device 120 from different identity provider compute device 140 API services. For example, the access token can be received from a first API service and the representation of the login token can be received from a second, different API service (e.g., at substantially the same time the access token is received, at a time different than when the access token is received, etc.). In some implementations of technique one, two, three, four, and/or five, the access token and/or representation of the login token can be received at user compute device 120 from the same identity provider compute device 140 API service.

Flowcharts

FIG. 2 shows a flowchart of a method 200 to perform key rotation, encryption, and decryption across a user compute device (e.g., user compute device 120), a sensor (e.g., sensor 100), and an identity provider compute device (e.g., identity provider compute device 140), according to an embodiment. In some implementations, method 200 is performed via a processor (e.g., processor 122).

At 202, a first document including a first (e.g., decrypting) version of a first key is received from a first compute device (e.g., identity provider compute device 140). At 204, a second document including a representation of a login token is received from the first compute device. At 206, an encrypted second key that has been encrypted by a second (e.g., encrypting) version of the first key is received after receiving the representation of the login token at 204 from a second compute device (e.g., sensor 100) that is different from the first compute device. The second compute device stores the second version of the first key. The second version of the first key is stored on the second compute device before the receiving of the first document at 202. At 208, the encrypted second key is decrypted using the first version of the first key to obtain a plaintext second key. At 210, encrypted sensor data that has been (1) captured prior to the receiving of the first document, and (2) encrypted by the plaintext second key is received from the second compute device. At 212, the encrypted sensor data is decrypted using the plaintext second key to obtain plaintext sensor data.

In some implementations, any of the subsequent steps of method 200 can be performed automatically (e.g., without human intervention) in response to completion of the previous step.

In some implementations of method 200, the first version of the first key is not different from the second version of the first key.

In some implementations of the method 200, the first version of the first key is different from the second version of the first key.

In some implementations of the method 200, the encrypted second key is received after the receiving of the first document and after the receiving of the second document.

In some implementations of the method 200, the first compute device is an identity provider (IdP) compute device.

Some implementations of the method 200 further include causing display of a representation of the plaintext sensor data via a web browser.

In some implementations of the method 200, the first document is received at a first time, the encrypted second key is received at a second time after the first time, and the encrypted sensor data is received after the second time.

In some implementations of the method 200, the plaintext sensor data includes sensor data captured at a first time, and the encrypted sensor data is decrypted using the plaintext second key to obtain the plaintext sensor data at a second time that is after the first time.

In some implementations of the method 200, the first document includes an access token.

FIG. 3 shows a flowchart of a method 300 to perform key rotation, encryption, and decryption across a user compute device (e.g., user compute device 120), a sensor (e.g., sensor 100), an identity provider compute device (e.g., identity provider compute device 140), and a key management compute device (e.g., key management compute device 160), according to an embodiment. In some implementations, method 300 is performed via a processor (e.g., processor 122).

At 302, a first document including a first (e.g., decrypting) version of a first key is received from a first compute device (e.g., identity provider compute device 140). At 304, a second document including a representation of a login token is received from the first compute device. At 306, an encrypted second key that has been encrypted by a second (e.g., encrypting) version of the first key is received from a second compute device (e.g., key management compute device 160) different than the first compute device. At 308, the encrypted second key is decrypted using the first version of the first key to obtain a first version of a second key. At 310, an encrypted third key that has been encrypted by a second version of the second key is received from a third compute device (e.g., sensor 100) different than the first compute device and the second compute device. At 312, the encrypted third key is decrypted using the first version of the second key to obtain a plaintext third key. At 314, encrypted sensor data that has been encrypted by the plaintext third key is received via the third compute device. At 316, the encrypted sensor data is decrypted using the plaintext third key, to obtain plaintext sensor data.

In some implementations, any of the subsequent steps of method 300 can be performed automatically (e.g., without human intervention) in response to completion of the previous step.

In some implementations of method 300, the second compute device does not have access to the first key.

In some implementations of method 300, the second compute device does not have access to the plaintext third key.

In some implementations of method 300, the plaintext sensor data includes video data.

In some implementations of method 300, the encrypted second key is received in response to the receiving of the representation of the login token.

In some implementations of method 300, the plaintext third key is generated by the third compute device. Some implementations of method 300 further include sending a public version of the second key to the third compute device to cause the third compute device to generate the encrypted third key using the public version of the second key.

Some implementations of method 300 further include displaying a representation of the plaintext sensor data via a web browser.

In some implementations of method 300, the second key is established on the third device at a first time, the first document is received at a second time after the first time, the encrypted second key is received at a third time after the second time, the encrypted third key is received at a fourth time after the third time, and the encrypted sensor data is received after the fourth time.

In some implementations of method 300, the plaintext sensor data includes sensor data captured at a first time, and the encrypted sensor data is decrypted using the plaintext third key to obtain the plaintext sensor data at a second time that is after the first time.

FIG. 4 shows a flowchart of a method 400 to perform key rotation, encryption, and decryption across a user compute device (e.g., user compute device 120), a sensor (e.g., sensor 100), an identity provider compute device (e.g., identity provider compute device 140), and a key management compute device (e.g., key management compute device 160), according to an embodiment. In some implementations, method 400 is performed via a processor (e.g., processor 122).

At 402, a first document including a first (e.g., decrypting) version of a first key is received from a first compute device (e.g., identity provider compute device 140). At 404, a second document including a representation of a login token is received from the first compute device. At 406, an encrypted second key that has been encrypted by a first version of the first key is received from a second compute device (e.g., key management compute device 160). At 408, the encrypted second key is decrypted using the first version of the first key to obtain a second key. At 410, an encrypted third key that has been encrypted by a second (e.g., encrypting) version of the second key is received from the second compute device. At 412, the encrypted third key is decrypted using a first version of the second key to obtain a third key. At 414, an encrypted fourth key that has been encrypted by the second version of the third key is received from a third compute device (e.g., sensor). At 416, the encrypted fourth key is decrypted using a first version of the third key to obtain a plaintext fourth key. At 418, encrypted sensor data that has been encrypted by the plaintext fourth key is received from the third compute device. At 420, the encrypted sensor data is decrypted using the plaintext fourth key to obtain plaintext sensor data.

In some implementations, any of the subsequent steps of method 400 can be performed automatically (e.g., without human intervention) in response to completion of the previous step.

In some implementations of method 400, the plaintext sensor data includes data that was captured by a camera.

Some implementations of method 400 further include receiving login information based on input from a user. Some implementations of method 400 further include sending the login information to the first compute device, the first document and the second document received in response to the first compute device confirming the login information.

Some implementations of method 400 further include receiving login information associated with a user, the encrypted third key received in response to verifying that the user is part of a predefined group authorized to receive the encrypted third key.

FIG. 5 shows a flowchart of a method 500 to perform key rotation, encryption, and decryption across a user compute device (e.g., user compute device 120), a sensor (e.g., sensor 100), and an identity provider compute device (e.g., identity provider compute device 140), according to an embodiment. In some implementations, method 500 is performed via a processor (e.g., processor 122).

At 502, a first document including a first (e.g., decrypting) version of a first key is received from a first compute device (e.g., identity provider compute device 140). At 504, a second document including a representation of a login token is received from the first compute device. At 506, a second (e.g., encrypting) version of a second key signed using the first version of the first key is sent to a second compute device (e.g., sensor 100) to cause the second compute device to verify the second version of the second key using a second version of the first key. The second version of the first key is stored on the second compute device before the receiving of the first document at 502. At 508, an encrypted third key is received from the second compute device. The encrypted third key has been encrypted by the second version of the second key. At 510, the encrypted third key is decrypted using a first version of the second key to obtain a plaintext third key. At 512, encrypted sensor data that has been encrypted by the plaintext third key is received from the second compute device. At 514, the encrypted sensor data is decrypted using the plaintext third key to obtain plaintext sensor data.

In some implementations, any of the subsequent steps of method 500 can be performed automatically (e.g., without human intervention) in response to completion of the previous step.

Figure 6:
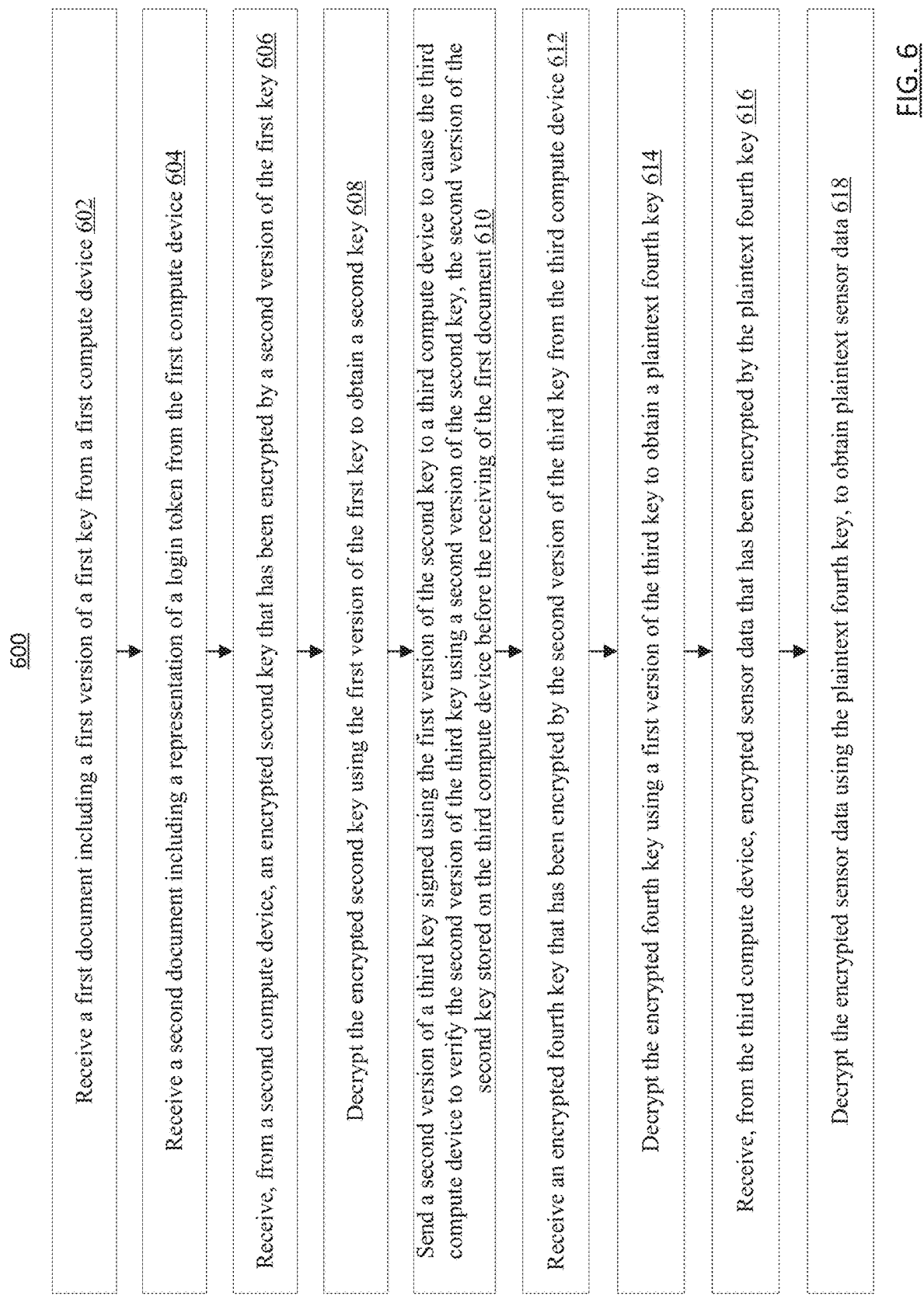
FIG. 6 shows a flowchart of a method to perform key rotation, encryption, and decryption across a user compute device, a sensor, an identity provider compute device, and a key management compute device, according to an embodiment.

FIG. 6 shows a flowchart of a method 600 to perform key rotation, encryption, and decryption across a user compute device (e.g., user compute device 120), a sensor (e.g., sensor 100), an identity provider compute device (e.g., identity provider compute device 140), and a key management compute device (e.g., key management compute device 160), according to an embodiment. In some implementations, method 600 is performed via a processor (e.g., processor 122).

At 602, a first document including a first (e.g., decrypting) version of a first key is received from a first compute device (e.g., identity provider compute device 140). At 604, a second document including a representation of a login token is received from the first compute device. At 606, an encrypted second key that has been encrypted by a second (e.g., encrypting) version of the first key is received from a second compute device (e.g., key management compute device 160). At 608, the encrypted second key is decrypted using the first version of the first key to obtain a second key. At 610, a second version of a third key signed using the first version of the second key is sent to a third compute device (e.g., sensor 100) to cause the third compute device to verify the second version of the third key using a second version of the second key. The second version of the second key is stored on the third compute device before the receiving of the first document. At 612, an encrypted fourth key that has been encrypted by the second version of the third key is received from the third compute device. At 614, the encrypted fourth key is decrypted using a first version of the third key to obtain a plaintext fourth key. At 616, encrypted sensor data that has been encrypted by the plaintext fourth key is received from the third compute device. At 618, the encrypted sensor data is decrypted using the plaintext fourth key to obtain plaintext sensor data.

In some implementations, any of the subsequent steps of method 600 can be performed automatically (e.g., without human intervention) in response to completion of the previous step.

Combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. As such, all examples and/or embodiments are deemed to be non-limiting throughout this disclosure.

It is to be understood that the logical and/or topological structure of any combination of any program components (a component collection), other components and/or any present feature sets as described in the Figures and/or throughout are not limited to a fixed operating order and/or arrangement, but rather, any disclosed order is an example and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting.

The invention claimed is:

1. A non-transitory, processor-readable medium storing instructions that, when executed by a processor, cause the processor to:
   receive, at a third compute device and from a second compute device, a representation of a URL and a first public key;
   receive, at the third compute device and from a first compute device, a representation of the URL and a second public key;
   perform, at the third compute device, a cryptographic key exchange with the second compute device and the first compute device;
   generate, at the third compute device, a shared key in response to performing the cryptographic key exchange;
   encrypt, at the third compute device, the shared key using the first public key to generate a first encrypted shared key;
   encrypt, at the third compute device, the shared key using the second public key to generate a second encrypted shared key;
   send, from the third compute device, the first encrypted shared key to the second compute device to cause the second compute device to decrypt the first encrypted shared key to generate a first decrypted shared key;
   send, from the third compute device, the second encrypted shared key to the first compute device to cause the first compute device to decrypt the second encrypted shared key to generate a second decrypted shared key;
   receive, at the third compute device, a representation of a first code derived from the first decrypted shared key and a representation of a second code derived from the second decrypted shared key; and
   determine, at the third compute device, if the cryptographic key exchange was intercepted based on a comparison of the first code and the second code.

2. The non-transitory, processor-readable medium of claim 1, wherein:
   the representation of the URL and the first public key is a first quick response (QR) code;
   the representation of the URL and the second public key is a second QR code;
   the instructions to receive the representation of the URL and the first public key include instructions to cause the processor to scan the first QR code when displayed at the second compute device; and
   the instructions to receive the representation of the URL and the second public key includes instructions to cause the processor to scan the second QR code when displayed at the first compute device.

3. The non-transitory, processor-readable medium of claim 1, wherein:
   the representation of the URL and the first public key is a first quick response (QR) code displayed at a first website accessed by the second compute device;
   the representation of the URL and the second public key is a second QR code displayed at a second website accessed by the first compute device;
   the instructions to receive the representation of the URL and the first public key include instructions to cause the processor to scan the first QR code when displayed at the second compute device; and
   the instructions to receive the representation of the URL and the second public key include instructions that, when executed by the processor, cause the processor to scan the second QR code when displayed at the first compute device.

4. The non-transitory, processor-readable medium of claim 1, wherein:
   the representation of the first code is displayed at the second compute device;
   the representation of the second code is displayed at the first compute device;
   the instructions to receive the representation of the first code include instructions to cause the processor to capture an image of the first code displayed at the second compute device; and
   the instructions to receive the representation of the second code includes instructions to cause the processor to capture an image of the second code displayed at the first compute device.

5. The non-transitory, processor-readable medium of claim 1, wherein the cryptographic key exchange is a Diffie-Hellman cryptographic key exchange.

6. The non-transitory, processor-readable medium of claim 1, wherein the first code includes a first hash value and the second code includes a second hash value.

7. The non-transitory, processor-readable medium of claim 1, wherein the first code includes a first checksum value and the second code includes a second checksum value.

8. The non-transitory, processor-readable medium of claim 1, wherein the non-transitory, processor-readable medium further stores instructions that, when executed by the processor, cause the processor to:
   receive, via the first decrypted shared key, at the third compute device, and from the second compute device, a key; and
   send, via the second decrypted shared key, from the third compute device, and to the first compute device, the key.

9. A method, comprising:
   generating, via a processor of a first compute device, a representation of a URL and a first version of a key associated with the first compute device;
   causing display, via the processor, of the representation of the URL and the first version of the key, to facilitate capture of the representation of the URL and the first version of the key by a third compute device;
   performing, via the processor, a cryptographic key exchange with the third compute device or a second compute device;

receiving, via the processor and from the third compute device, an encrypted shared key encrypted using the first version of the key;

decrypting, via the processor, the encrypted shared key using a second version of the key to obtain a first unencrypted shared key; and causing display, via the processor, of a first code derived from the first unencrypted shared key, the first code received at the third compute device and used, along with a second code (1) derived from a second unencrypted shared key and displayed at the second compute device and (2) received at the third compute device, by the third compute device to determine whether the cryptographic key exchange was intercepted.

10. The method of claim 9, wherein:
the representation of the URL and the first version of the key is a quick response (QR) code, and
the second compute device receives the representation of the URL and the first version of the key by scanning the QR code.

11. The method of claim 9, wherein the representation of the URL and the first version of the key is a QR code displayed at a first website.

12. The method of claim 9, wherein the cryptographic key exchange is a Diffie-Hellman cryptographic key exchange.

13. The method of claim 9, wherein:
the first code includes a first hash value, and
the second code includes a second hash value.

14. The method of claim 9, wherein:
the first code includes a first checksum value, and
the second code includes a second checksum value.

15. The method of claim 9, wherein the key is a first key, the method further comprising:
sending, via the processor, a second key to the third compute device by the first unencrypted shared key, the third compute device configured to send the second key to the second compute device by the second unencrypted shared key in response to receiving the second key.

16. The method of claim 9, wherein the key is a first key, the method further comprising:
receiving, via the processor, a second key from the third compute device by the first unencrypted shared key, the second key received at the third compute device from the second compute device by the second unencrypted shared key.

17. A non-transitory, processor-readable medium storing instructions that, when executed by a processor, cause the processor to:
wrap, at a first compute device, a first key with a transfer key to generate a wrapped key, the transfer key generated at the first compute device;
send a representation of the wrapped key from the first compute device to a second compute device; and
send a representation of the transfer key from the first compute device to a third compute device without the second compute device receiving the transfer key, the third compute device receiving the wrapped key from the second compute device and unwrapping the wrapped key using the transfer key to obtain the first key after the third compute device receives the representation of the transfer key.

18. The non-transitory, processor-readable medium of claim 17, wherein the instructions to cause the processor to send the representation of the transfer key to the third compute device includes instructions that, when executed by the processor, cause the processor to:
display, via a website, a quick response (QR) code representing the transfer key,
the third compute device configured to scan the QR code.

19. The non-transitory, processor-readable medium of claim 17, wherein the instructions to send the representation of the transfer key to the third compute device include instructions to send the representation of the transfer key to the third compute device via an email.

20. The non-transitory, processor-readable medium of claim 17, wherein the instructions to send the representation of the transfer key to the third compute device include instructions to send the representation of the transfer key to the third compute device via a text message.

* * * * *